US012367670B2

(12) United States Patent
Dasgupta et al.

(10) Patent No.: US 12,367,670 B2
(45) Date of Patent: *Jul. 22, 2025

(54) OBJECT TRACKING BY AN UNMANNED AERIAL VEHICLE USING VISUAL SENSORS

(71) Applicant: Skydio, Inc., San Mateo, CA (US)

(72) Inventors: Saumitro Dasgupta, Redwood City, CA (US); Hayk Martirosyan, San Francisco, CA (US); Hema Koppula, Palo Alto, CA (US); Alex Kendall, Cambridge (GB); Austin Stone, San Francisco, CA (US); Matthew Donahoe, Redwood City, CA (US); Abraham Galton Bachrach, Emerald Hills, CA (US); Adam Parker Bry, Redwood City, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,113

(22) Filed: Dec. 29, 2023

(65) Prior Publication Data
US 2024/0273894 A1 Aug. 15, 2024

Related U.S. Application Data

(63) Continuation of application No. 17/712,613, filed on Apr. 4, 2022, now Pat. No. 11,861,892, which is a
(Continued)

(51) Int. Cl.
*G06V 20/13* (2022.01)
*B64C 39/02* (2023.01)
(Continued)

(52) U.S. Cl.
CPC ............ *G06V 20/13* (2022.01); *B64C 39/024* (2013.01); *B64U 10/14* (2023.01); *G05D 1/0011* (2013.01);
(Continued)

(58) Field of Classification Search
CPC ........ G06V 20/13; G06V 10/82; G06V 20/17; G06V 30/274; B64C 39/024;
(Continued)

(56) References Cited

U.S. PATENT DOCUMENTS

| 5,211,172 A | 5/1993 | McGuane et al. |
| 6,366,311 B1 | 4/2002 | Monroe |

(Continued)

FOREIGN PATENT DOCUMENTS

| AU | 2010219335 A1 | 9/2010 |
| WO | 2013006210 A1 | 1/2013 |

(Continued)

OTHER PUBLICATIONS

Aguiar, Antonio Pedro et al., "Logic-Based Switching Control for Trajectory-Tracking and Path-Following of Underactuated Autonomous Vehicles With Parametric Modeling Uncertainty," Proceeding of the 2004 American Control Conference, pp. 3004-3010, Jun. 30-Jul. 2, 2004.

(Continued)

*Primary Examiner* — Christopher S Kelley
*Assistant Examiner* — Ana Picon-Feliciano

(57) ABSTRACT

Systems and methods are disclosed for tracking objects in a physical environment using visual sensors onboard an autonomous unmanned aerial vehicle (UAV). In certain embodiments, images of the physical environment captured by the onboard visual sensors are processed to extract semantic information about detected objects. Processing of the captured images may involve applying machine learning techniques such as a deep convolutional neural network to extract semantic cues regarding objects detected in the images. The object tracking can be utilized, for example, to
(Continued)

facilitate autonomous navigation by the UAV or to generate and display augmentative information regarding tracked objects to users.

20 Claims, 16 Drawing Sheets

Related U.S. Application Data continuation of application No. 15/827,945, filed on Nov. 30, 2017, now Pat. No. 11,295,458.

(60) Provisional application No. 62/428,972, filed on Dec. 1, 2016.

(51) Int. Cl.

| | |
|---|---|
| *B64U 10/14* | (2023.01) |
| *G05D 1/00* | (2024.01) |
| *G06F 18/2431* | (2023.01) |
| *G06N 3/045* | (2023.01) |
| *G06T 3/60* | (2024.01) |
| *G06T 7/10* | (2017.01) |
| *G06T 7/11* | (2017.01) |
| *G06T 7/20* | (2017.01) |
| *G06T 7/292* | (2017.01) |
| *G06T 7/579* | (2017.01) |
| *G06T 7/73* | (2017.01) |
| *G06V 10/82* | (2022.01) |
| *G06V 20/17* | (2022.01) |
| *G06V 30/262* | (2022.01) |
| *H04N 13/00* | (2018.01) |
| *H04N 13/239* | (2018.01) |
| *H04N 13/243* | (2018.01) |
| *H04N 13/282* | (2018.01) |
| *B64U 101/00* | (2023.01) |
| *B64U 101/30* | (2023.01) |
| *B64U 101/31* | (2023.01) |

(52) U.S. Cl.
CPC ........ *G05D 1/0094* (2013.01); *G06F 18/2431* (2023.01); *G06T 3/60* (2013.01); *G06T 7/10* (2017.01); *G06T 7/11* (2017.01); *G06T 7/20* (2013.01); *G06T 7/292* (2017.01); *G06T 7/579* (2017.01); *G06T 7/75* (2017.01); *G06V 10/82* (2022.01); *G06V 20/17* (2022.01); *G06V 30/274* (2022.01); *H04N 13/239* (2018.05); *H04N 13/243* (2018.05); *H04N 13/282* (2018.05); *B64U 2101/00* (2023.01); *B64U 2101/30* (2023.01); *B64U 2101/31* (2023.01); *B64U 2201/10* (2023.01); *G06N 3/045* (2023.01); *G06T 2207/10012* (2013.01); *G06T 2207/10028* (2013.01); *G06T 2207/10032* (2013.01); *G06T 2207/20084* (2013.01); *G06T 2207/20088* (2013.01); *G06T 2207/30196* (2013.01); *G06T 2207/30241* (2013.01); *H04N 2013/0081* (2013.01); *H04N 2013/0085* (2013.01); *H04N 2013/0092* (2013.01)

(58) Field of Classification Search
CPC ............... G05D 1/0011; G05D 1/0094; G06F 18/2431; G06T 3/60; G06T 7/10; G06T 7/11; G06T 7/20; G06T 7/292; G06T 7/579; G06T 7/75; G06T 2207/10012; G06T 2207/10028; G06T 2207/10032; G06T 2207/20084; G06T 2207/20088; G06T 2207/30196; G06T 2207/30241; H04N 13/239; H04N 13/243; H04N 13/282; H04N 2013/0081; H04N 2013/0085; H04N 2013/0092; B64U 2101/00; B64U 2101/30; B64U 2201/10; B64U 10/14; B64U 2101/31; G06N 3/045
USPC .......................................... 348/48
See application file for complete search history.

(56) References Cited

U.S. PATENT DOCUMENTS

| | | | |
|---|---|---|---|
| 6,744,397 | B1 | 6/2004 | Hager et al. |
| 7,363,157 | B1 | 4/2008 | Hanna et al. |
| 7,773,116 | B1 | 8/2010 | Stevens |
| 8,031,175 | B2 | 10/2011 | Rigazio et al. |
| 8,043,513 | B2 | 10/2011 | Milanovic et al. |
| 8,301,326 | B2 | 10/2012 | Malecki et al. |
| 8,446,471 | B2 | 5/2013 | Wu et al. |
| 8,712,679 | B1 | 4/2014 | Mostofi et al. |
| 8,958,928 | B2 | 2/2015 | Seydoux et al. |
| 9,132,913 | B1 | 9/2015 | Shapiro et al. |
| 9,243,916 | B2 | 1/2016 | Roumeliotis et al. |
| 9,454,154 | B1 | 9/2016 | Safarik |
| 9,534,917 | B2 | 1/2017 | Abuelsaad et al. |
| 9,588,516 | B1 | 3/2017 | Gurel et al. |
| 9,609,288 | B1 | 3/2017 | Richman et al. |
| 9,663,227 | B1 | 5/2017 | Lema et al. |
| 9,678,506 | B2 | 6/2017 | Bachrach et al. |
| 9,690,289 | B2 | 6/2017 | Yang et al. |
| 9,738,381 | B1 | 8/2017 | Loud et al. |
| 9,739,870 | B1 | 8/2017 | Beckman et al. |
| 9,753,460 | B1 | 9/2017 | Safarik |
| 9,766,074 | B2 | 9/2017 | Roumeliotis et al. |
| 9,798,322 | B2 | 10/2017 | Bachrach et al. |
| 9,891,621 | B2 | 2/2018 | Bachrach et al. |
| 9,930,298 | B2 | 3/2018 | Bevirt |
| 9,972,212 | B1 | 5/2018 | Sperindeo et al. |
| 10,007,265 | B1 | 6/2018 | Larsen |
| 10,033,980 | B2 | 7/2018 | Boyd et al. |
| 10,074,183 | B1 | 9/2018 | Watson |
| 10,182,225 | B1 | 1/2019 | Cui et al. |
| 10,488,860 | B1 | 11/2019 | Koch et al. |
| 11,295,458 | B2 * | 4/2022 | Dasgupta .................. G06T 7/10 |
| 11,347,217 | B2 | 5/2022 | Bachrach et al. |
| 11,861,892 | B2 * | 1/2024 | Dasgupta ............... G06V 20/13 |
| 11,892,859 | B2 | 2/2024 | Meisenholder et al. |
| 2007/0078573 | A1 | 4/2007 | Ivansson et al. |
| 2007/0106473 | A1 | 5/2007 | Bodin et al. |
| 2008/0033604 | A1 | 2/2008 | Margolin |
| 2008/0267451 | A1 | 10/2008 | Karazi |
| 2009/0125223 | A1 | 5/2009 | Higgins |
| 2009/0157233 | A1 | 6/2009 | Kokkeby et al. |
| 2009/0228205 | A1 | 9/2009 | Ariyur et al. |
| 2010/0013860 | A1 | 1/2010 | Mandella et al. |
| 2010/0084513 | A1 | 4/2010 | Gariepy et al. |
| 2010/0157055 | A1 | 6/2010 | Pechatnikov |
| 2010/0191391 | A1 | 7/2010 | Zeng |
| 2010/0198514 | A1 | 8/2010 | Miralles |
| 2010/0228414 | A1 | 9/2010 | Scheu |
| 2010/0250032 | A1 | 9/2010 | Gremmert |
| 2010/0277587 | A1 | 11/2010 | Pechatnikov et al. |
| 2010/0302359 | A1 | 12/2010 | Adams et al. |
| 2010/0305778 | A1 | 12/2010 | Dorneich et al. |
| 2010/0321470 | A1 | 12/2010 | Oshima |
| 2011/0044498 | A1 | 2/2011 | Cobb et al. |
| 2011/0090399 | A1 | 4/2011 | Whitaker et al. |
| 2011/0147515 | A1 | 6/2011 | Miller et al. |
| 2011/0311099 | A1 | 12/2011 | Derbanne |
| 2012/0114229 | A1 | 5/2012 | Zhou |
| 2012/0148162 | A1 | 6/2012 | Zhang et al. |
| 2012/0212406 | A1 | 8/2012 | Osterhout et al. |
| 2012/0236030 | A1 | 9/2012 | Border et al. |
| 2013/0030875 | A1 | 1/2013 | Lee et al. |
| 2013/0127980 | A1 | 5/2013 | Haddick et al. |
| 2013/0182906 | A1 | 7/2013 | Kojo et al. |
| 2013/0271579 | A1 | 10/2013 | Wang |
| 2013/0278631 | A1 | 10/2013 | Border et al. |
| 2013/0317667 | A1 | 11/2013 | Kruglick |

(56) References Cited

U.S. PATENT DOCUMENTS

| | | |
|---|---|---|
| 2014/0013364 A1 | 1/2014 | Vondoenhoff et al. |
| 2014/0019352 A1 | 1/2014 | Shrivastava |
| 2014/0035736 A1 | 2/2014 | Weddle et al. |
| 2014/0043436 A1 | 2/2014 | Bell et al. |
| 2014/0067160 A1 | 3/2014 | Levien et al. |
| 2014/0168461 A1 | 6/2014 | Dani et al. |
| 2014/0226024 A1 | 8/2014 | Limbaugh et al. |
| 2014/0267777 A1 | 9/2014 | Le Clerc et al. |
| 2014/0270743 A1 | 9/2014 | Webb et al. |
| 2014/0306866 A1 | 10/2014 | Miller et al. |
| 2014/0316616 A1 | 10/2014 | Kugelmass |
| 2014/0316698 A1 | 10/2014 | Roumeliotis et al. |
| 2014/0324253 A1 | 10/2014 | Duggan et al. |
| 2014/0327770 A1 | 11/2014 | Wagreich |
| 2014/0336928 A1 | 11/2014 | Scott |
| 2014/0371952 A1 | 12/2014 | Ohtomo et al. |
| 2015/0022640 A1 | 1/2015 | Metzler et al. |
| 2015/0027044 A1 | 1/2015 | Redden |
| 2015/0042800 A1 | 2/2015 | Choi et al. |
| 2015/0062339 A1 | 3/2015 | Ostrom |
| 2015/0153436 A1 | 6/2015 | Benson |
| 2015/0158587 A1 | 6/2015 | Patrick et al. |
| 2015/0160658 A1 | 6/2015 | Reedman et al. |
| 2015/0201180 A1 | 7/2015 | Mourikis et al. |
| 2015/0230150 A1 | 8/2015 | Wang et al. |
| 2015/0242972 A1 | 8/2015 | Lemmey et al. |
| 2015/0259078 A1 | 9/2015 | Filipovic et al. |
| 2015/0310603 A1 | 10/2015 | Moraites et al. |
| 2015/0312774 A1 | 10/2015 | Lau |
| 2015/0341540 A1 | 11/2015 | Kim et al. |
| 2015/0346915 A1 | 12/2015 | Kondekar et al. |
| 2015/0370250 A1 | 12/2015 | Bachrach et al. |
| 2016/0018822 A1 | 1/2016 | Nevdahs et al. |
| 2016/0035224 A1 | 2/2016 | Yang et al. |
| 2016/0041266 A1 | 2/2016 | Smits |
| 2016/0050840 A1 | 2/2016 | Sauder et al. |
| 2016/0054737 A1 | 2/2016 | Soll et al. |
| 2016/0068267 A1 | 3/2016 | Liu et al. |
| 2016/0070265 A1 | 3/2016 | Liu et al. |
| 2016/0110618 A1 | 4/2016 | Oba |
| 2016/0122038 A1 | 5/2016 | Fleischman et al. |
| 2016/0129999 A1 | 5/2016 | Mays |
| 2016/0139596 A1 | 5/2016 | Na et al. |
| 2016/0140729 A1 | 5/2016 | Soatto et al. |
| 2016/0144943 A1 | 5/2016 | Cheng et al. |
| 2016/0176538 A1 | 6/2016 | Bekanich |
| 2016/0232423 A1 | 8/2016 | Zhong et al. |
| 2016/0267325 A1 | 9/2016 | Sundaresan et al. |
| 2016/0280397 A1 | 9/2016 | Christ et al. |
| 2016/0299504 A1 | 10/2016 | Hsiao |
| 2016/0304198 A1 | 10/2016 | Jourdan |
| 2016/0327950 A1 | 11/2016 | Bachrach et al. |
| 2016/0344981 A1 | 11/2016 | Lunt |
| 2017/0008521 A1 | 1/2017 | Braunstein et al. |
| 2017/0010623 A1 | 1/2017 | Tang et al. |
| 2017/0023937 A1 | 1/2017 | Loianno et al. |
| 2017/0024877 A1 | 1/2017 | Versace et al. |
| 2017/0031032 A1 | 2/2017 | Garin et al. |
| 2017/0039764 A1 | 2/2017 | Hu et al. |
| 2017/0039859 A1 | 2/2017 | Hu et al. |
| 2017/0066135 A1 | 3/2017 | Cohen et al. |
| 2017/0116776 A1 | 4/2017 | Aughey |
| 2017/0140542 A1 | 5/2017 | Hodohara |
| 2017/0180729 A1 | 6/2017 | Wu |
| 2017/0180754 A1 | 6/2017 | Wu et al. |
| 2017/0192418 A1 | 7/2017 | Bethke et al. |
| 2017/0201714 A1 | 7/2017 | Kim et al. |
| 2017/0210486 A1 | 7/2017 | O'Brien et al. |
| 2017/0219347 A1 | 8/2017 | Veto |
| 2017/0227656 A1 | 8/2017 | Niesen et al. |
| 2017/0275023 A1 | 9/2017 | Harris et al. |
| 2017/0278014 A1 | 9/2017 | Lessmann et al. |
| 2017/0294010 A1 | 10/2017 | Shen et al. |
| 2017/0301109 A1 | 10/2017 | Chan et al. |
| 2017/0305546 A1 | 10/2017 | Ni et al. |
| 2017/0313416 A1 | 11/2017 | Mishra et al. |
| 2017/0313441 A1 | 11/2017 | Tsai |
| 2017/0314926 A1 | 11/2017 | Royster et al. |
| 2017/0314927 A1 | 11/2017 | Royster et al. |
| 2017/0329324 A1 | 11/2017 | Bachrach et al. |
| 2017/0341776 A1 | 11/2017 | McClure et al. |
| 2017/0351933 A1 | 12/2017 | Bleiweiss |
| 2017/0357858 A1 | 12/2017 | Mendonca et al. |
| 2017/0358099 A1 | 12/2017 | Harris et al. |
| 2017/0359515 A1 | 12/2017 | Harris et al. |
| 2017/0359943 A1 | 12/2017 | Calleija et al. |
| 2017/0371353 A1 | 12/2017 | Millinger, III |
| 2018/0046187 A1 | 2/2018 | Martirosyan et al. |
| 2018/0074524 A1 | 3/2018 | Yamasaki |
| 2018/0095459 A1 | 4/2018 | Bachrach et al. |
| 2018/0129278 A1 | 5/2018 | Luchinskiy |
| 2018/0157255 A1 | 6/2018 | Halverson et al. |
| 2018/0201272 A1 | 7/2018 | Takeda |
| 2018/0234496 A1 | 8/2018 | Ratias |
| 2018/0246507 A1 | 8/2018 | Bachrach et al. |
| 2018/0336768 A1 | 11/2018 | Sethi et al. |
| 2019/0011921 A1 | 1/2019 | Wang et al. |
| 2019/0027036 A1 | 1/2019 | Mishina et al. |
| 2019/0035278 A1 | 1/2019 | Mishina et al. |
| 2019/0149735 A1 | 5/2019 | Harris et al. |
| 2019/0204824 A1 | 7/2019 | Micros |

FOREIGN PATENT DOCUMENTS

| | | |
|---|---|---|
| WO | 2015/105886 A1 | 7/2015 |
| WO | 2016/086379 A1 | 6/2016 |

OTHER PUBLICATIONS

Ataei, Mansour et al., "Three-Dimensional Optimal Path Planning for Waypoint Guidance of an Autonomous Underwater Vehicle," Robotics and Autonomous Systems, vol. 67, pp. 23-32, 2015, available online Oct. 24, 2014.

Brake, Nicholas J., Master's Thesis for "Control System Development for Small UAV Gimbal," 113 pages, Aug. 2012.

Gu, Feng et al., "Active Persistent Localization of a Three-Dimensional Moving Target Under Set-Membership Uncertainty Description Through Cooperation of Multiple Mobile Robots," IEEE Transactions on Industrial Electronics, vol. 62, No. 8, pp. 4958-4971, Aug. 2015, initial publication Feb. 19, 2015.

Horenstein, Henry, "Black & White Photography—A Basic Manual," Third Revised Edition, Chapter 6, p. 94, 2005.

International Application No. PCT/US2016/027921, International Search Report, Written Opinion, 12 pages, Jul. 15, 2016.

Kakvand, P. et al., "Smart On-Board UAV System: Using Computer Vision System to Find a Movable and Stationary Target," IEEE, pp. 694-699, 2015.

Kalnins, L. M., "Coordinate Systems," 5 pages, Mar. 2009.

Kaminer, Isaac et al., "Trajectory Tracking for Autonomous Vehicles: An Integrated Approach to Guidance and Control," Journal of Guidance, Control, and Dynamics, vol. 21, No. 1, pp. 29-38, Jan.-Feb. 1998.

Kim, Seungkeun et al., "Three Dimensional Optimum Controller for Multiple UAV Formation Flight Using Behavior-Based Decentralized Approach," International Conference on Control, Automation and Systems, pp. 1387-1392, Oct. 17-20, 2007.

Mansfield, Katrina et al., "Unmanned Aerial Vehicle Smart Device Ground Control Station Cyber Security Threat Model," IEEE, pp. 722-728, 2013.

O'Reilly, O. M., "Engineering Dynamics: A Primer," Chapter 2, pp. 17-25, 2010.

Quigley, Morgan et al., "Target Acquisition, Localization, and Surveillance Using a Fixed-Wing Mini-UAV and Gimbaled Camera," IEEE, pp. 2600-2605, 2005.

Santana, Lucas Vago et al., "Outdoor Waypoint Navigation With The AR.Drone Quadrotor," IEEE, pp. 303-311, 2015.

* cited by examiner

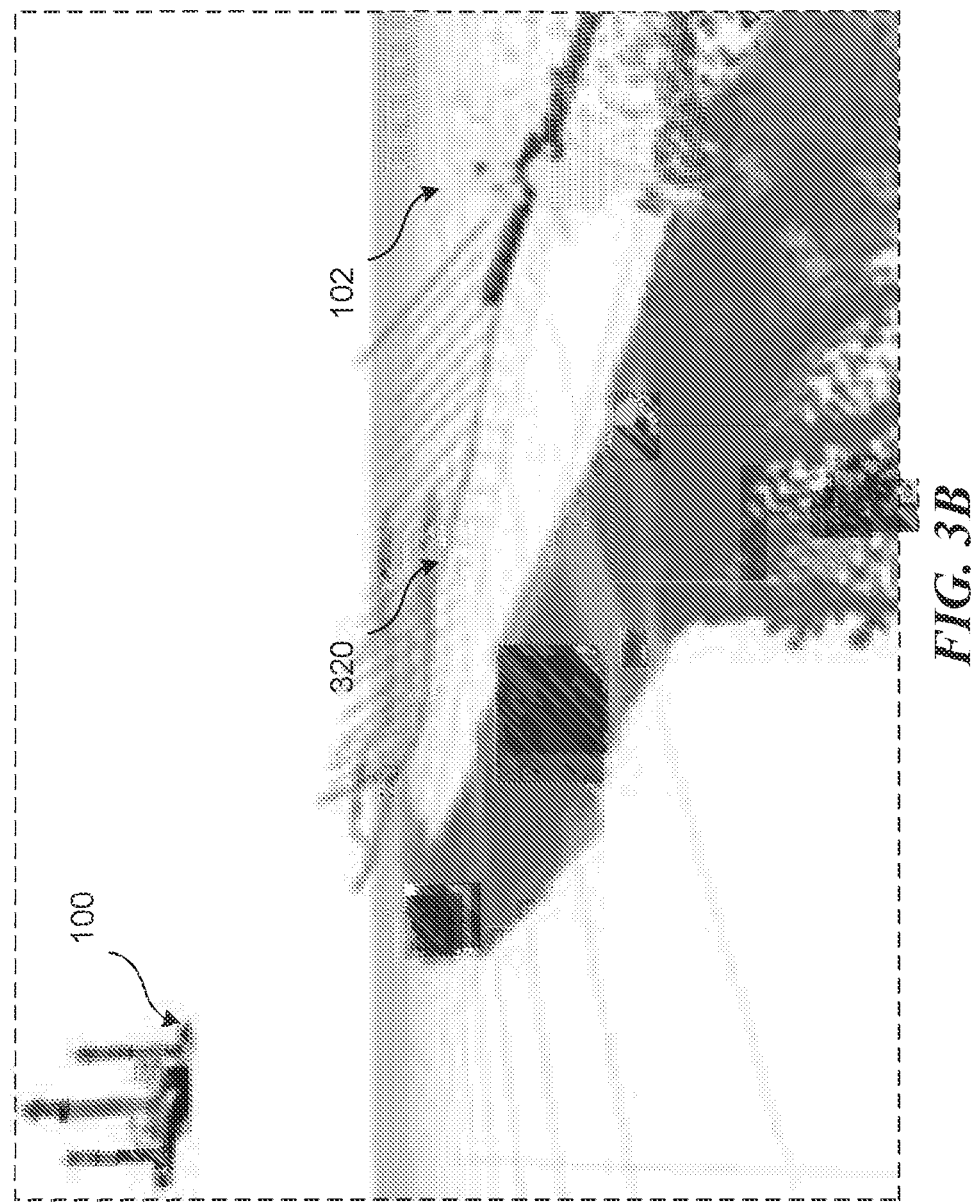

OBJECT TRACKING BY AN UNMANNED AERIAL VEHICLE USING VISUAL SENSORS

CROSS-REFERENCE TO RELATED APPLICATION(S)

This application is a continuation of U.S. patent application Ser. No. 17/712,613, titled "OBJECT TRACKING BY AN UNMANNED AERIAL VEHICLE USING VISUAL SENSORS," filed Apr. 4, 2022; which is a continuation of U.S. patent application Ser. No. 15/827,945, titled "OBJECT TRACKING BY AN UNMANNED AERIAL VEHICLE USING VISUAL SENSORS," filed Nov. 30, 2017; which is entitled to the benefit and/or right of priority of U.S. Provisional Patent Application No. 62/428,972, titled "SUBJECT TRACKING BY A UAV USING VISUAL SENSORS," filed Dec. 1, 2016, the contents of each of which are hereby incorporated by reference in their entirety for all purposes. This application is therefore entitled to a priority date of Dec. 1, 2016.

TECHNICAL FIELD

The present disclosure generally relates autonomous vehicle technology.

BACKGROUND

Increasingly, digital image capture is being used to guide autonomous vehicle navigation systems. For example, an autonomous vehicle with an onboard image capture device can be configured to capture images of a surrounding physical environment that are then used to estimate a position and/or orientation of the autonomous vehicle within the physical environment. This process is generally referred to as visual odometry. An autonomous navigation system can then utilize these position and/or orientation estimates to guide the autonomous vehicle through the physical environment.

BRIEF DESCRIPTION OF THE DRAWINGS

FIG. 3B shows a visual representation of a predicted trajectory of an object based on images captured from a UAV.

DETAILED DESCRIPTION

From the foregoing, it will be appreciated that specific embodiments of the invention have been described herein for purposes of illustration, but that various modifications may be made without deviating from the scope of the invention. Accordingly, the invention is not limited except as by the appended claims.

Example Implementation of an Unmanned Aerial Vehicle

Figure 1A:
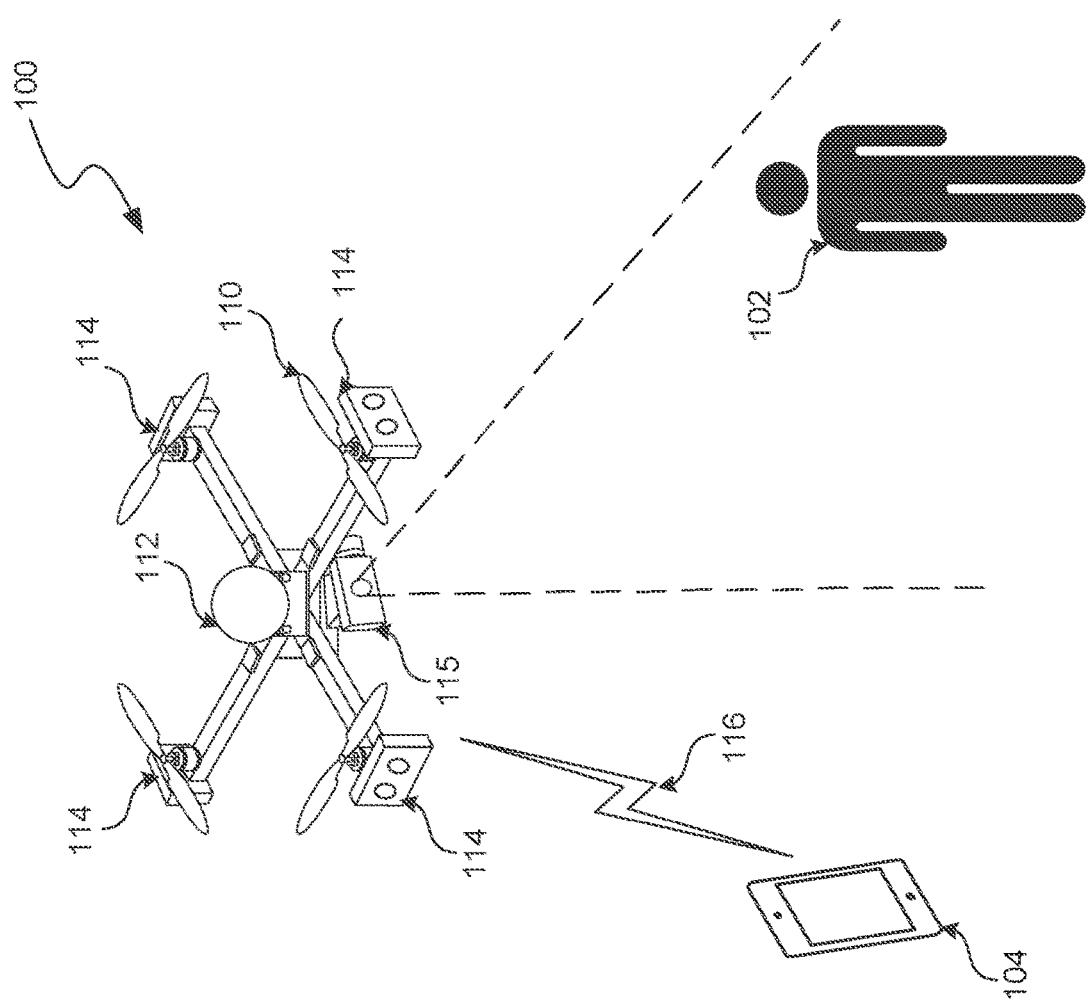
FIG. 1A shows an example configuration of an autonomous vehicle in the form of an unmanned aerial vehicle (UAV) within which certain techniques described herein may be applied.

FIG. 1A shows an example configuration of an unmanned aerial vehicle (UAV) 100 within which certain techniques described herein may be applied. As shown in FIG. 1A, UAV 100 may be configured as a rotor-based aircraft (e.g., a "quadcopter"). The example UAV 100 includes propulsion and control actuators 110 (e.g., powered rotors or aerodynamic control surfaces) for maintaining controlled flight, various sensors for automated navigation and flight control 112, and one or more image capture devices 114 and 115 for capturing images (including video) of the surrounding physical environment while in flight. Although not shown in FIG. 1A, UAV 100 may also include other sensors (e.g., for capturing audio) and means for communicating with other devices (e.g., a mobile device 104) via a wireless communication channel 116.

In the example depicted in FIG. 1A, the image capture devices 114 and/or 115 are depicted capturing an object 102 in the physical environment that happens to be a person. In some cases, the image capture devices may be configured to capture images for display to users (e.g., as an aerial video platform) and/or, as described above, may also be configured for capturing images for use in autonomous navigation. In other words, the UAV 100 may autonomously (i.e., without direct human control) navigate the physical environment, for example, by processing images captured by any one or more image capture devices. While in autonomous flight, UAV 100 can also capture images using any one or more image capture devices that can be displayed in real time and or recorded for later display at other devices (e.g., mobile device 104).

FIG. 1A shows an example configuration of a UAV 100 with multiple image capture devices configured for different purposes. In the example configuration shown in FIG. 1, the UAV 100 includes multiple image capture devices 114 arranged about a perimeter of the UAV 100. The image capture device 114 may be configured to capture images for use by a visual navigation system in guiding autonomous flight by the UAV 100 and/or a tracking system for tracking other objects in the physical environment (e.g., as described with respect to FIG. 1B). Specifically, the example configuration of UAV 100 depicted in FIG. 1A includes an array of multiple stereoscopic image capture devices 114 placed around a perimeter of the UAV 100 so as to provide stereoscopic image capture up to a full 360 degrees around the UAV 100.

In addition to the array of image capture devices 114, the UAV 100 depicted in FIG. 1A also includes another image capture device 115 configured to capture images that are to be displayed but not necessarily used for navigation. In some embodiments, the image capture device 115 may be similar to the image capture devices 114 except in how captured images are utilized. However, in other embodiments, the image capture devices 115 and 114 may be configured differently to suit their respective roles.

In many cases, it is generally preferable to capture images that are intended to be viewed at as high a resolution as possible given certain hardware and software constraints. On the other hand, if used for visual navigation and/or object tracking, lower resolution images may be preferable in certain contexts to reduce processing load and provide more robust motion planning capabilities. Accordingly, in some embodiments, the image capture device 115 may be configured to capture relatively high resolution (e.g., 3840×2160) color images while the image capture devices 114 may be configured to capture relatively low resolution (e.g., 320×240) grayscale images.

As will be described in more detail, the UAV 100 can be configured to track one or more objects such as a human subject 102 through the physical environment based on images received via the image capture devices 114 and/or 115. Further the UAV 100 can be configured to track image capture of such objects, for example, for filming purposes. In some embodiments, the image capture device 115 is coupled to the body of the UAV 100 via an adjustable mechanism that allows for one or more degrees of freedom of motion relative to a body of the UAV 100. The UAV 100 may be configured to automatically adjust an orientation of the image capture device 115 so as to track image capture of an object (e.g., human subject 102) as both the UAV 100 and object are in motion through the physical environment. In some embodiments, this adjustable mechanism may include a mechanical gimbal mechanism that rotates an attached image capture device about one or more axes. In some embodiments, the gimbal mechanism may be configured as a hybrid mechanical-digital gimbal system coupling the image capture device 115 to the body of the UAV 100. In a hybrid mechanical-digital gimbal system, orientation of the image capture device 115 about one or more axes may be adjusted by mechanical means, while orientation about other axes may be adjusted by digital means. For example, a mechanical gimbal mechanism may handle adjustments in the pitch of the image capture device 115, while adjustments in the roll and yaw are accomplished digitally by transforming (e.g., rotating, panning, etc.) the captured images so as to effectively provide at least three degrees of freedom in the motion of the image capture device 115 relative to the UAV 100.

Figure 1B:
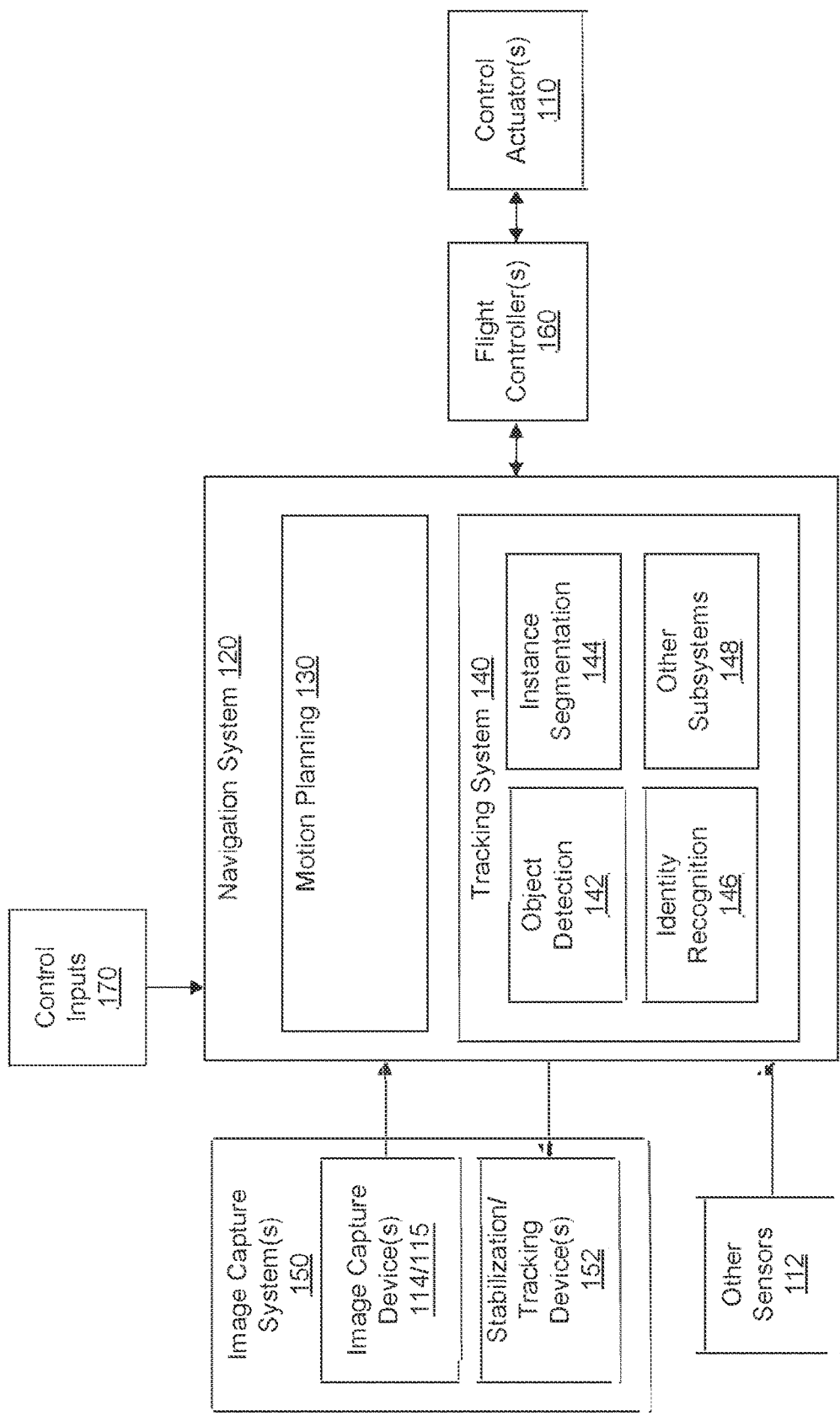
FIG. 1B shows a block diagram of an example navigation system that may be implemented with the UAV of FIG. 1A.

FIG. 1B is a block diagram that illustrates an example navigation system 120 that may be implemented as part of the example UAV 100 described with respect to FIG. 1A. The navigation system 120 may include any combination of hardware and/or software. For example, in some embodiments, the navigation system 120 and associated subsystems, may be implemented as instructions stored in memory and executable by one or more processors.

As shown in FIG. 1B, the example navigation system 120 includes a motion planning system 130 for autonomously maneuvering the UAV 100 through a physical environment and a tracking system 140 for tracking one or more objects in the physical environment. The tracking subsystem 140 may include one or more subsystems such as an object detection subsystem 142, an instance segmentation subsystem 144, an identity recognition subsystem 146, and any other subsystems 148. The purposes of such subsystems will be described in more detail later. Note that the arrangement of systems shown in FIG. 1B is an example provided for illustrative purposes and is not to be construed as limiting. For example, in some embodiments, the tracking system 140 may be completely separate from the navigation system 120. Further, the subsystems making up the navigation system 120 may not be logically separated as shown in FIG. 1B.

In some embodiments, the motion planning system 130, operating separately or in conjunction with the tracking system 140, is configured to generate a planned trajectory through the 3D space of a physical environment based, for example, on images received from image capture devices 114 and/or 115, data from other sensors 112 (e.g., IMU, GPS, proximity sensors, etc.), one or more control inputs 170 from external sources (e.g., from a remote user, navigation application, etc.), and/or one or more specified navigation objectives. Navigation objectives may include, for example, avoiding collision with other objects and/or maneuvering to follow a particular object (e.g., an object tracked by tracking system 140). In some embodiments, the generated planned trajectory is continuously or continually (i.e., at regular or irregular intervals) updated based on new perception inputs (e.g., newly captured images) received as the UAV 100 autonomously navigates the physical environment.

In some embodiments, the navigation system 120 may generate control commands configured to cause the UAV 100 to maneuver along the planned trajectory generated by the motion planning system 130. For example, the control commands may be configured to control one or more control actuators 110 (e.g., rotors and/or control surfaces) to cause the UAV 100 to maneuver along the planned 3D trajectory. Alternatively, a planned trajectory generated by the motion planning system 120 may be output to a separate flight controller system 160 that is configured to process trajectory information and generate appropriate control commands configured to control the one or more control actuators 110.

As will be described in more detail, the tracking system 140, operating separately or in conjunction with the motion planning system 130, is configured to track one or more objects in the physical environment based, for example, on images received from image capture devices 114 and/or 115, data from other sensors 112 (e.g., IMU, GPS, proximity sensors, etc.), one or more control inputs 170 from external sources (e.g., from a remote user, navigation application, etc.), and/or one or more specified tracking objectives. A tracking object may include, for example, a designation by a user to track a particular detected object in the physical environment or a standing objective to track objects of a particular classification (e.g., people).

As alluded to above, the tracking system 140 may communicate with the motion planning system 130, for example, to maneuver the UAV 100 based on measured, estimated, and/or predicted positions, orientations, and/or trajectories of objects in the physical environment. For example, the tracking system 140 may communicate a navigation objective to the motion planning system 130 to maintain a particular separation distance to a tracked object that is in motion.

In some embodiments, the tracking system 140, operating separately or in conjunction with the motion planning system 130, is further configured to generate control commands configured to cause a mechanism to adjust an orientation of any image capture devices 114/115 relative to the body of the UAV 100 based on the tracking of one or more objects. Such a mechanism may include a mechanical gimbal or a hybrid digital mechanical gimbal, as previously described. For example, while tracking an object in motion relative to the UAV 100, the tracking system 140 may generate control commands configured to adjust an orientation of an image capture device 115 so as to keep the tracked object centered in the field of view (FOV) of the image capture device 115 while the UAV 100 is in motion. Similarly, the tracking system 140 may generate commands or output data to a digital image processor (e.g., that is part of a hybrid digital-mechanical gimbal) to transform images captured by the image capture device 115 to keep the tracked object centered in the FOV of the image capture device 115 while the UAV 100 is in motion.

The UAV 100 shown in FIG. 1A and the associated navigation system 120 shown in FIG. 1B are examples provided for illustrative purposes. A UAV 100 in accordance with the present teachings may include more or fewer components than are shown. Further, the example UAV 100 depicted in FIG. 1A and associated navigation system 120 depicted in FIG. 1B may include or be part of one or more of the components of the example UAV system 1300 described with respect to FIG. 13 and/or the example computer processing system 1400 described with respect to FIG. 14. For example, the aforementioned navigation system 120 and associated tracking system 140 may include or be part of the UAV system 1300 and/or processing system 1400. While the introduced techniques for object tracking are described in the context of an aerial vehicle such as the UAV 100 depicted in FIG. 1A, such techniques are not limited to this context. The described techniques may similarly be applied to detect, identify, and track objects using image capture devices mounted to other types of vehicles (e.g., fixed-wing aircraft, automobiles, watercraft, etc.), hand-held image capture devices (e.g., mobile devices with integrated cameras), or to stationary image capture devices (e.g., building mounted security cameras).

Object Tracking Overview

A UAV 100 can be configured to track one or more objects, for example, to enable intelligent autonomous flight. The term "objects" in this context can include any type of physical object occurring in the physical world. Objects can include dynamic objects such as a people, animals, and other vehicles. Objects can also include static objects such as landscape features, buildings, and furniture. Further, certain descriptions herein may refer to a "subject" (e.g., human subject 102). The terms "subject" as used herein may simply refer to an object being tracked using any of the disclosed techniques. The terms "object" and "subject" may therefore be used interchangeably.

A tracking system 140 associated with a UAV 100 can be configured to track one or more physical objects based on images of the objects captured by image capture devices (e.g., image capture devices 114 and/or 115) onboard the UAV 100. While a tracking system 140 can be configured to operate based only on input from image capture devices, the tracking system 140 can also be configured to incorporate other types of information to aid in the tracking. For example, various other techniques for measuring, estimating, and/or predicting the relative positions and/or orientations of the UAV 100 and/or other objects are described with respect to FIGS. 10-12.

Figure 2:
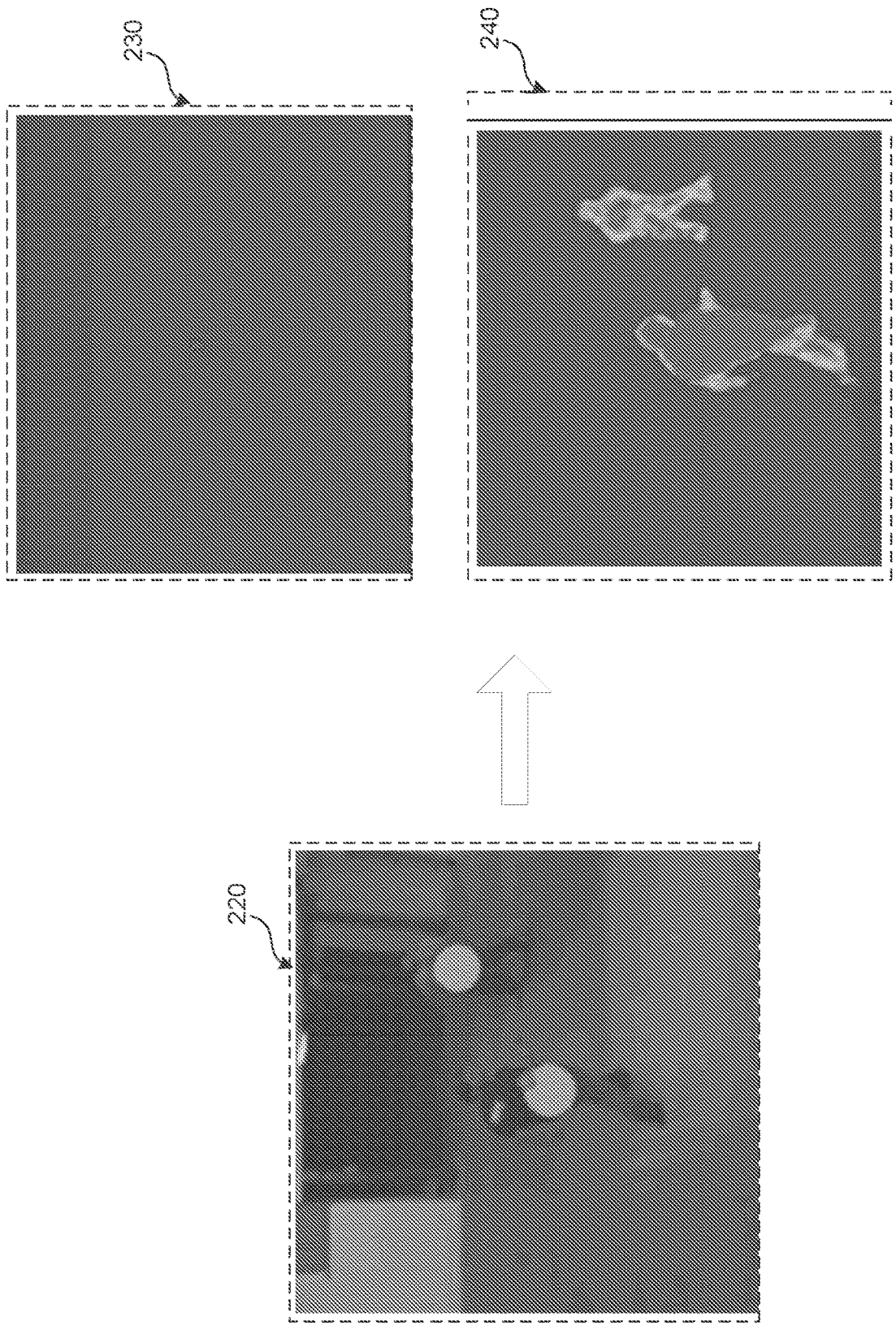
FIG. 2 shows an example image captured by a UAV in flight through a physical environment with associated visualizations of data regarding tracked objects based on processing of the captured image.

In some embodiments, a tracking system 140 can be configured to fuse information pertaining to two primary categories: semantics and three-dimensional (3D) geometry. As images are received, the tracking system 140 may extract semantic information regarding certain objects captured in the images based on an analysis of the pixels in the images. Semantic information regarding a captured object can include information such as an object's category (i.e., class), location, shape, size, scale, pixel segmentation, orientation, inter-class appearance, activity, and pose. In an example embodiment, the tracking system 140 may identify general locations and categories of objects based on captured images and then determine or infer additional more detailed information about individual instances of objects based on further processing. Such a process may be performed as a sequence of discrete operations, a series of parallel operations, or as a single operation. For example, FIG. 2 shows an example image 220 captured by a UAV in flight through a physical environment. As shown in FIG. 2, the example image 220 includes captures of two physical objects, specifically, two people present in the physical environment. The example image 220 may represent a single frame in a series of frames of video captured by the UAV. As previously alluded to, a tracking system 140 may first identify general locations of the captured objects in the image 220. For example, pixel map 230 shows two dots corresponding to the general locations of the captured objects in the image. These general locations may be represented as image coordinates. The tracking system 140 may further process the captured image 220 to determine information about the individual instances of the captured objects. For example, pixel map 240 shows a result of additional processing of image 220 identifying pixels corresponding to the individual object instances (i.e., people in this case). Semantic cues can be used to locate and identify objects in captured images as well as associate identified objects occurring in multiple images. For example, as previously mentioned, the captured image 220 depicted in FIG. 2 may represent a single frame in a sequence of frames of a captured video. Using semantic cues, a tracking system 140 may associate regions of pixels captured in multiple images as corresponding to the same physical object occurring in the physical environment. Additional details regarding semantic algorithms that can be employed are described later in this disclosure.

In some embodiments, a tracking system 140 can be configured to utilize 3D geometry of identified objects to associate semantic information regarding the objects based on images captured from multiple views in the physical environment. Images captured from multiple views may include images captured by multiple image capture devices having different positions and/or orientations at a single time instant. For example, each of the image capture devices 114 shown mounted to a UAV 100 in FIG. 1 include cameras at slightly offset positions (to achieve stereoscopic capture). Further, even if not individually configured for stereoscopic image capture, the multiple image capture devices 114 may be arranged at different positions relative to the UAV 100, for example, as shown in FIG. 1. Images captured from multiple views may also include images captured by an image captured device at multiple time instants as the image capture device moves through the physical environment. For example, any of the image capture devices 114 and/or 115 mounted to UAV 100 will individually capture images from multiple views as the UAV 100 moves through the physical environment.

Figure 3A:
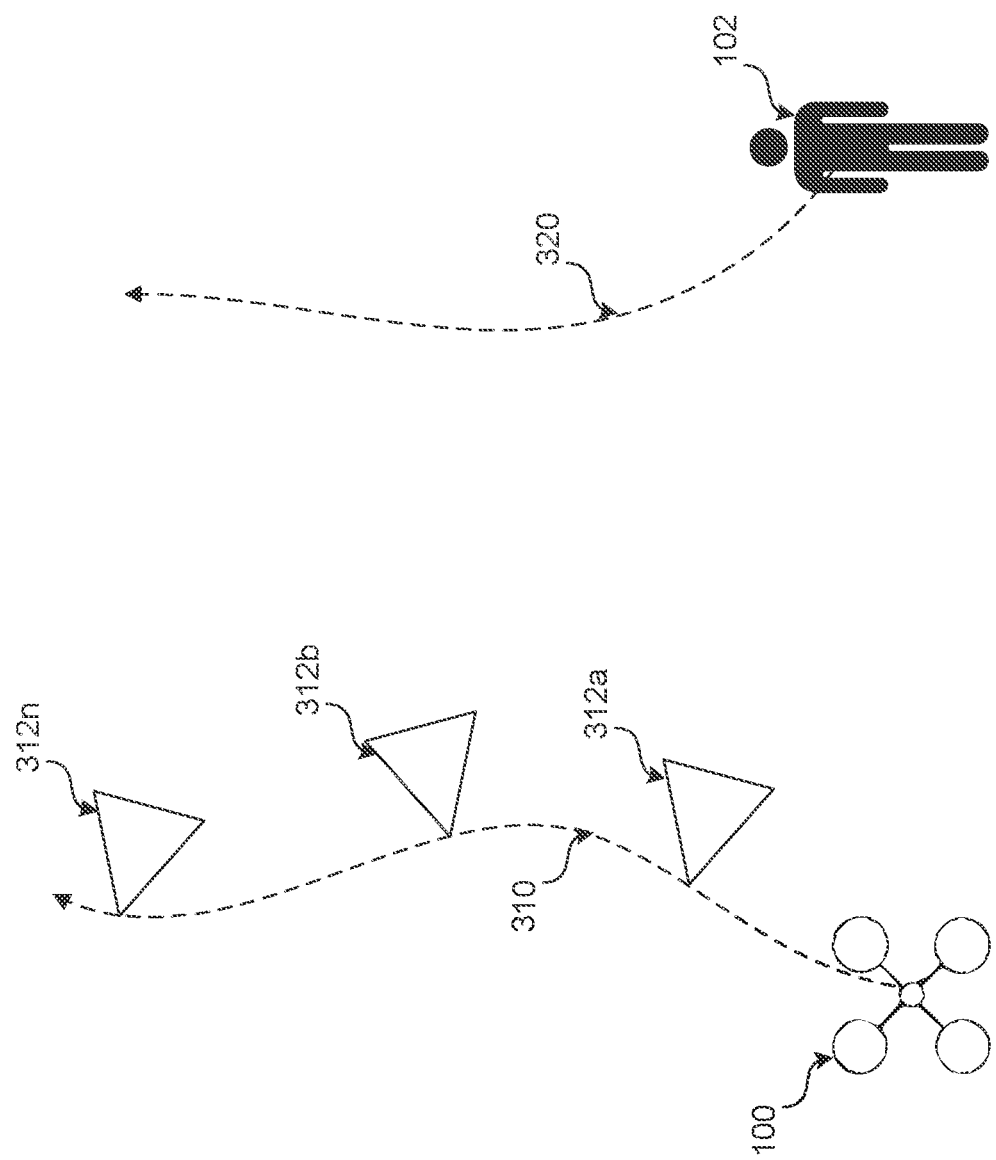
FIG. 3A shows a diagram illustrating an example process for estimating a trajectory of an object based on multiple images captured by a UAV.

Using an online visual-inertial state estimation system, a tracking system 140 can determine or estimate a trajectory of the UAV 100 as it moves through the physical environment. Thus, the tracking system 140 can associate semantic information in captured images, such as locations of detected objects, with information about the 3D trajectory of the objects, using the known or estimated 3D trajectory of the UAV 100. For example, FIG. 3A shows a trajectory 310 of a UAV 100 moving through a physical environment. As the UAV 100 moves along trajectory 310, the one or more image capture devices (e.g., devices 114 and/or 115) captured images of the physical environment at multiple views 312*a-n*. Included in the images at multiple views 312*a-n* are captures of an object such as a human subject 102. By processing the captured images at multiple views 312*a-n*, a trajectory 320 of the object can also be resolved.

Object detections in captured images create rays from a center position of a capturing camera to the object along which the object lies, with some uncertainty. The tracking system 140 can compute depth measurements for these detections, creating a plane parallel to a focal plane of a camera along which the object lies, with some uncertainty. These depth measurements can be computed by a stereo vision algorithm operating on pixels corresponding with the object between two or more camera images at different views. The depth computation can look specifically at pixels that are labeled to be part of an object of interest (e.g., a subject 102). The combination of these rays and planes over time can be fused into an accurate prediction of the 3D position and velocity trajectory of the object over time. For example, FIG. 3B shows a visual representation of a predicted trajectory of a subject 102 based on images captured from a UAV 100.

While a tracking system 140 can be configured to rely exclusively on visual data from image capture devices onboard a UAV 100, data from other sensors (e.g. sensors on the object, on the UAV 100, or in the environment) can be incorporated into this framework when available. Additional sensors may include GPS, IMU, barometer, magnetometer, and cameras at other devices such as a mobile device 104. For example, a GPS signal from a mobile device 104 held by a person can provide rough position measurements of the person that are fused with the visual information from image capture devices onboard the UAV 100. An IMU sensor at the UAV 100 and/or a mobile device 104 can provide acceleration and angular velocity information, a barometer can provide relative altitude, and a magnetometer can provide heading information. Images captured by cameras at a mobile device 104 held by a person can be fused with images from cameras onboard the UAV 100 to estimate relative pose between the UAV 100 and the person by identifying common features captured in the images. Various other techniques for measuring, estimating, and/or predicting the relative positions and/or orientations of the UAV 100 and/or other objects are described with respect to FIGS. 10-12.

Figure 4:
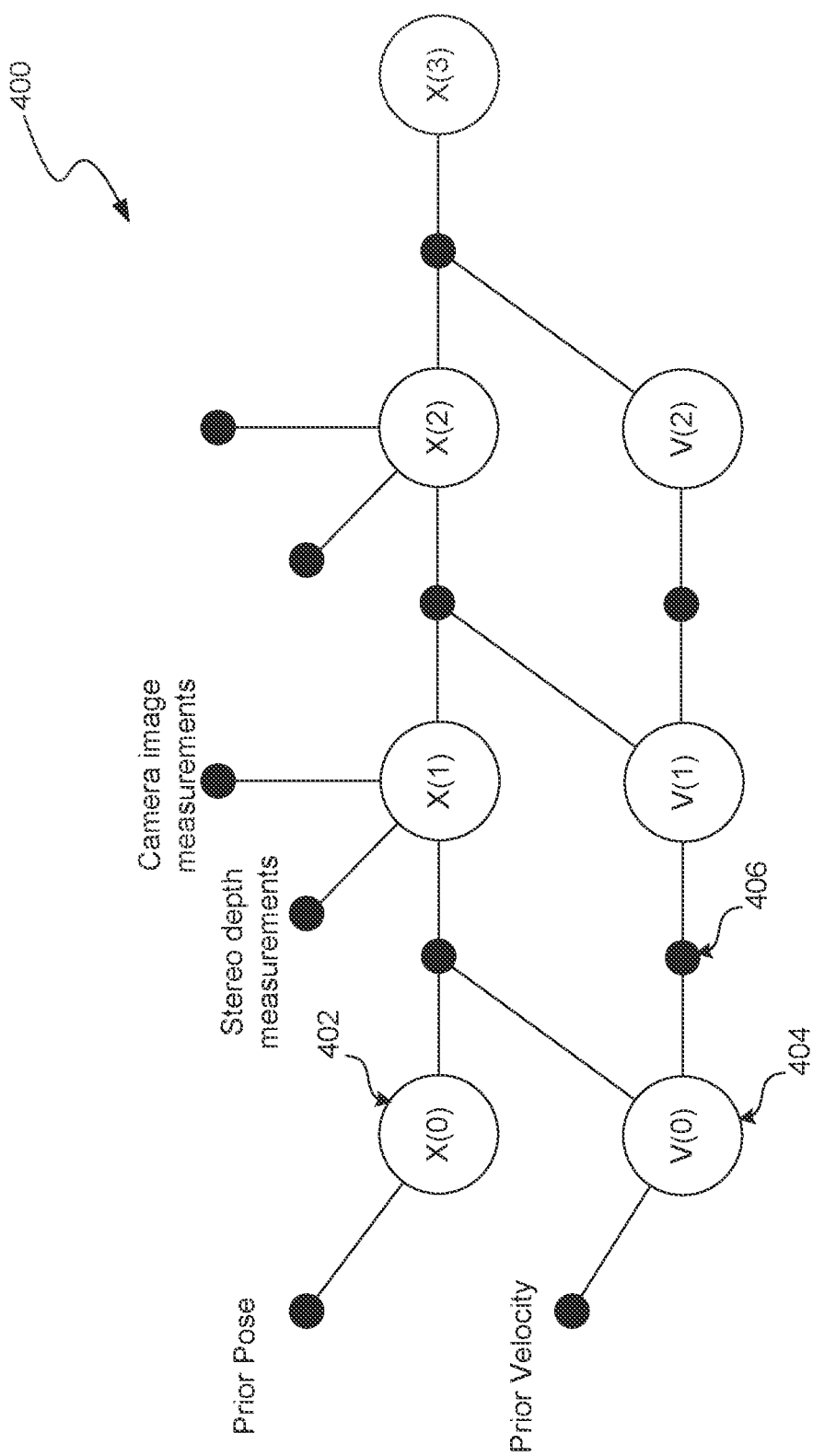
FIG. 4 shows a diagrammatic representation of an example spatiotemporal factor graph.

In some embodiments, data from various sensors are input into a spatiotemporal factor graph to probabilistically minimize total measurement error using non-linear optimization. FIG. 4 shows a diagrammatic representation of an example spatiotemporal factor graph 400 that can be used to estimate a 3D trajectory of an object (e.g., including pose and velocity over time). In the example spatiotemporal factor graph 400 depicted in FIG. 4, variable values such as the pose and velocity (represented as nodes (402 and 404 respectively)) connected by one or more motion model processes (represented as nodes 406 along connecting edges). For example, an estimate or prediction for the pose of the UAV 100 and/or other object at time step 1 (i.e., variable X(1)) may be calculated by inputting estimated pose and velocity at a prior time step (i.e., variables X(0) and V(0)) as well as various perception inputs such as stereo depth measurements and camera image measurements via one or more motion models. A spatiotemporal factor model can be combined with an outlier rejection mechanism wherein measurements deviating too far from an estimated distribution are thrown out. In order to estimate a 3D trajectory from measurements at multiple time instants, one or more motion models (or process models) are used to connect the estimated variables between each time step in the factor graph. Such motion models can include any one of constant velocity, zero velocity, decaying velocity, and decaying acceleration. Applied motion models may be based on a classification of a type of object being tracked and/or learned using machine learning techniques. For example, a cyclist is likely to make wide turns at speed, but is not expected to move sideways. Conversely, a small animal such as a dog may exhibit a more unpredictable motion pattern.

Figure 5:
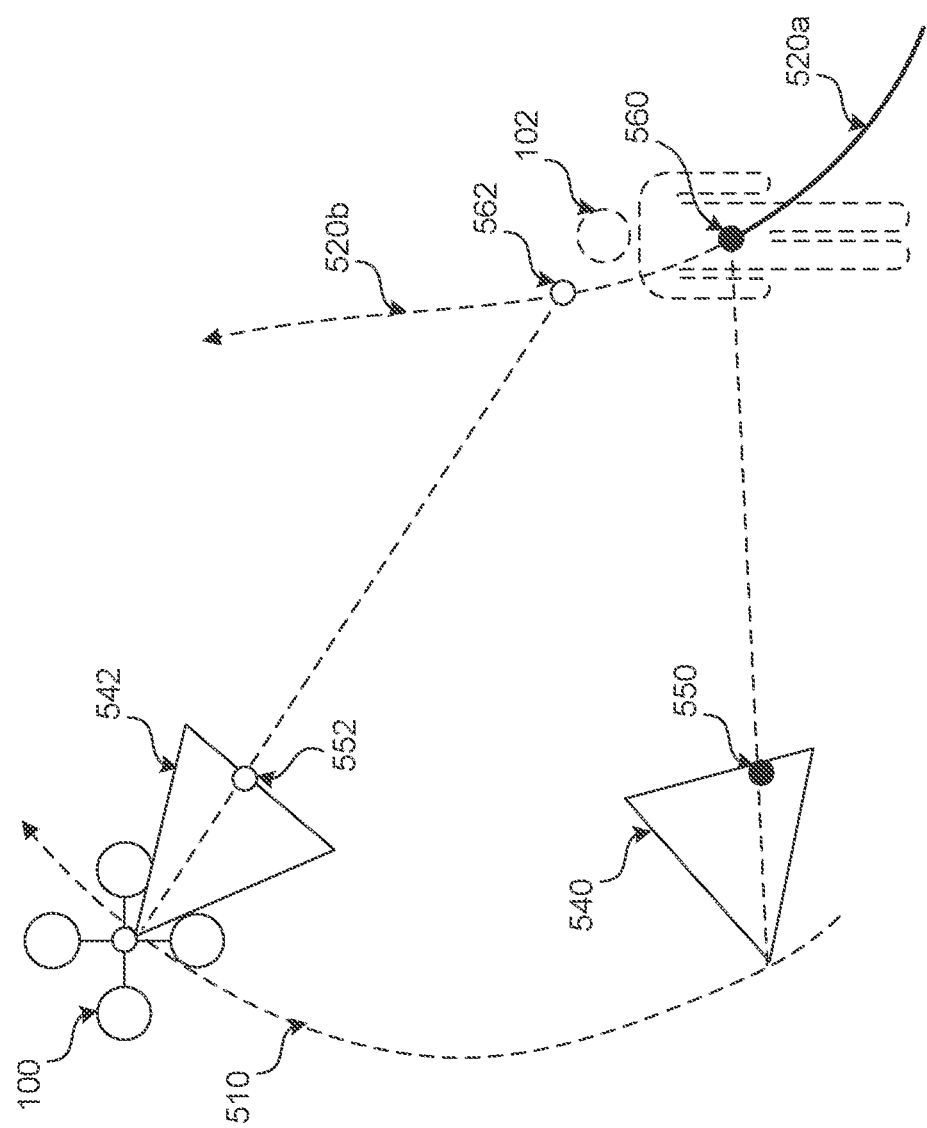
FIG. 5 shows a diagram that illustrates the process of generating an intelligent initial estimate for where a tracked object will appear in a subsequently captured image.

In some embodiments, a tracking system 140 can generate an intelligent initial estimate for where a tracked object will appear in a subsequently captured image based on a predicted 3D trajectory of the object. FIG. 5 shows a diagram that illustrates this concept. As shown in FIG. 5, a UAV 100 is moving along a trajectory 410 while capturing images of the surrounding physical environment, including of a human subject 102. As the UAV 100 moves along the trajectory 510, multiple images (e.g., frames of video) are captured from one or more mounted image capture devices 114/115. FIG. 5 shows a first FOV of an image capture device at a first pose 540 and a second FOV of the image capture device at a second pose 542. In this example, the first pose 540 may represent a previous pose of the image capture device at a time instant t(0) while the second pose 542 may represent a current pose of the image capture device at a time instant t(1). At time instant t(0), the image capture device captures an image of the human subject 102 at a first 3D position 560 in the physical environment. This first position 560 may be the last known position of the human subject 102. Given the first pose 540 of the image capture device, the human subject 102 while at the first 3D position 560 appears at a first image position 550 in the captured image. An initial estimate for a second (or current) image position 552 can therefore be made based on projecting a last known 3D trajectory 520*a* of the human subject 102 forward in time using one or more motion models associated with the object. For example, predicted trajectory 520*b* shown in FIG. 5 represents this projection of the 3D trajectory 520*a* forward in time. A second 3D position 562 (at time t(1)) of the human subject 102 along this predicted trajectory 520*b* can then be calculated based on an amount of time elapsed from t(0) to t(1). This second 3D position 562 can then be projected into the image plane of the image capture device at the second pose 542 to estimate the second image position 552 that will correspond to the human subject 102. Generating such an initial estimate for the position of a tracked object in a newly captured image narrows down the search space for tracking and enables a more robust tracking system, particularly in the case of a UAV 100 and/or tracked object that exhibits rapid changes in position and/or orientation.

In some embodiments, the tracking system 140 can take advantage of two or more types of image capture devices onboard the UAV 100. For example, as previously described with respect to FIG. 1, the UAV 100 may include image capture device 114 configured for visual navigation as well as an image captured device 115 for capturing images that are to be viewed. The image capture devices 114 may be configured for low-latency, low-resolution, and high FOV, while the image capture device 115 may be configured for high resolution. An array of image capture devices 114 about a perimeter of the UAV 100 can provide low-latency information about objects up to 360 degrees around the UAV 100 and can be used to compute depth using stereo vision algorithms. Conversely, the other image capture device 115 can provide more detailed images (e.g., high resolution, color, etc.) in a limited FOV.

Figure 6:
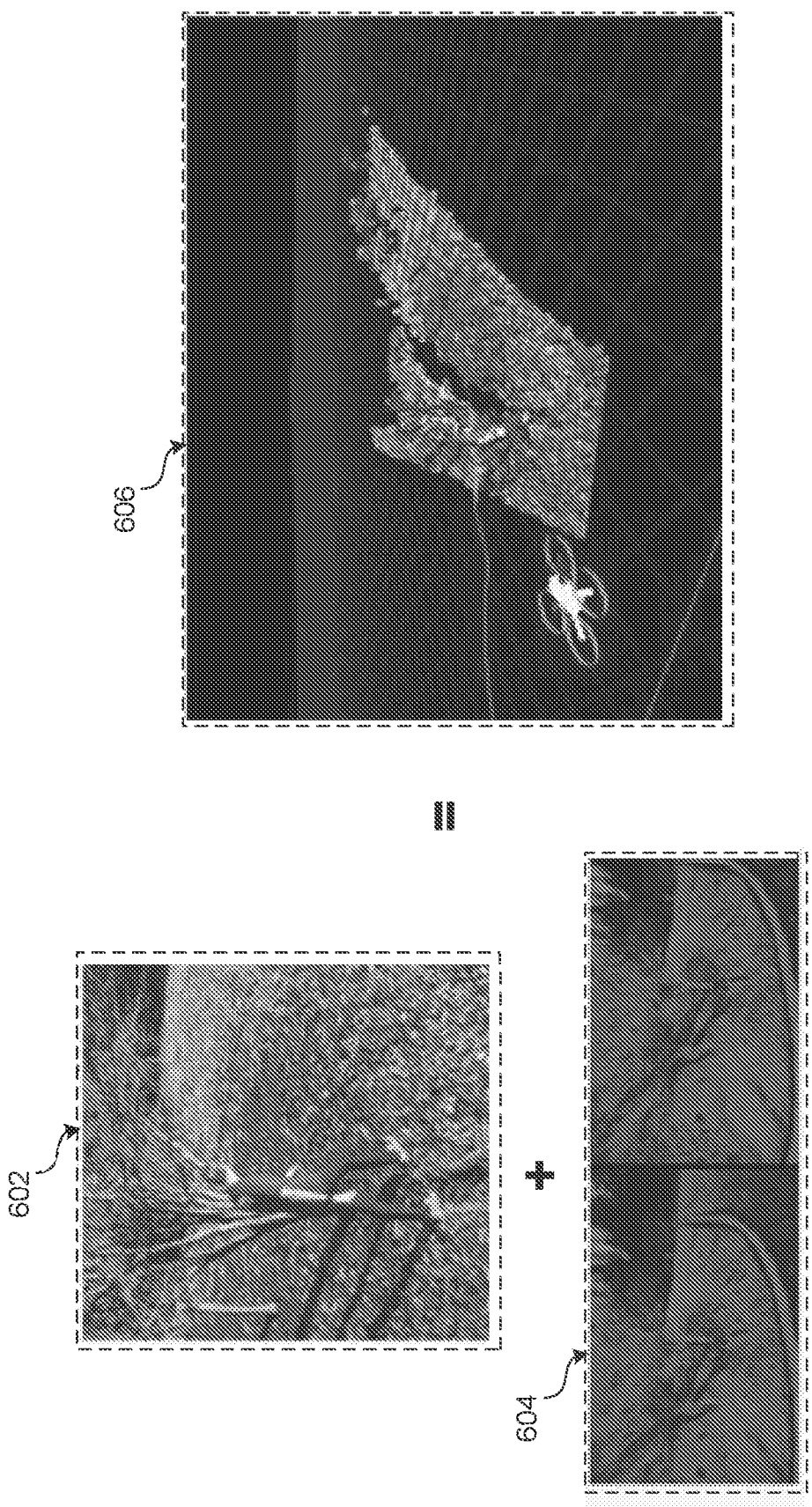
FIG. 6 shows how images can be fused with depth information to generate a 3D representation of a tracked object.

Combining information from both types of image capture devices 114 and 115 can be beneficial for object tracking purposes in a number of ways. First, the high-resolution color information 602 from an image capture device 115 can be fused with depth information 604 from the image capture devices 114 to create a 3D representation 606 of a tracked object, for example, as shown in FIG. 6. Second, the low-latency of the image capture devices 114 can enable more accurate detection of objects and estimation of object trajectories. Such estimates can be further improved and/or corrected based on images received from a high-latency, high resolution image capture device 115. The image data from the image capture devices 114 can either be fused with the image data from the image capture device 115, or can be used purely as an initial estimate.

By using the image capture devices 114, a tracking system 140 can achieve tracking of objects up to a full 360 degrees around the UAV 100. The tracking system 140 can fuse measurements from any of the image capture devices 114 or 115 when estimating a relative position and/or orientation of a tracked object as the positions and orientations of the image capture devices 114 and 115 change over time. The tracking system 140 can also orient the image capture device 115 to get more accurate tracking of specific objects of interest, fluidly incorporating information from both image capture modalities. Using knowledge of where all objects in the scene are, the UAV 100 can exhibit more intelligent autonomous flight.

As previously discussed, the high-resolution image capture device 115 may be mounted to an adjustable mechanism such as a gimbal that allows for one or more degrees of freedom of motion relative to the body of the UAV 100. Such a configuration is useful in stabilizing image capture as well as tracking objects of particular interest. An active gimbal mechanism configured to adjust an orientation of a higher-resolution image capture device 115 relative to the UAV 100 so as to track a position of an object in the physical environment may allow for visual tracking at greater distances than may be possible through use of the lower-resolution image capture devices 114 alone. Implementation of an active gimbal mechanism may involve estimating the orientation of one or more components of the gimbal mechanism at any given time. Such estimations may be based on any of hardware sensors coupled to the gimbal mechanism (e.g., accelerometers, rotary encoders, etc.), visual information from the image capture devices 114/115, or a fusion based on any combination thereof.

Detecting Objects for Tracking

Figure 7:
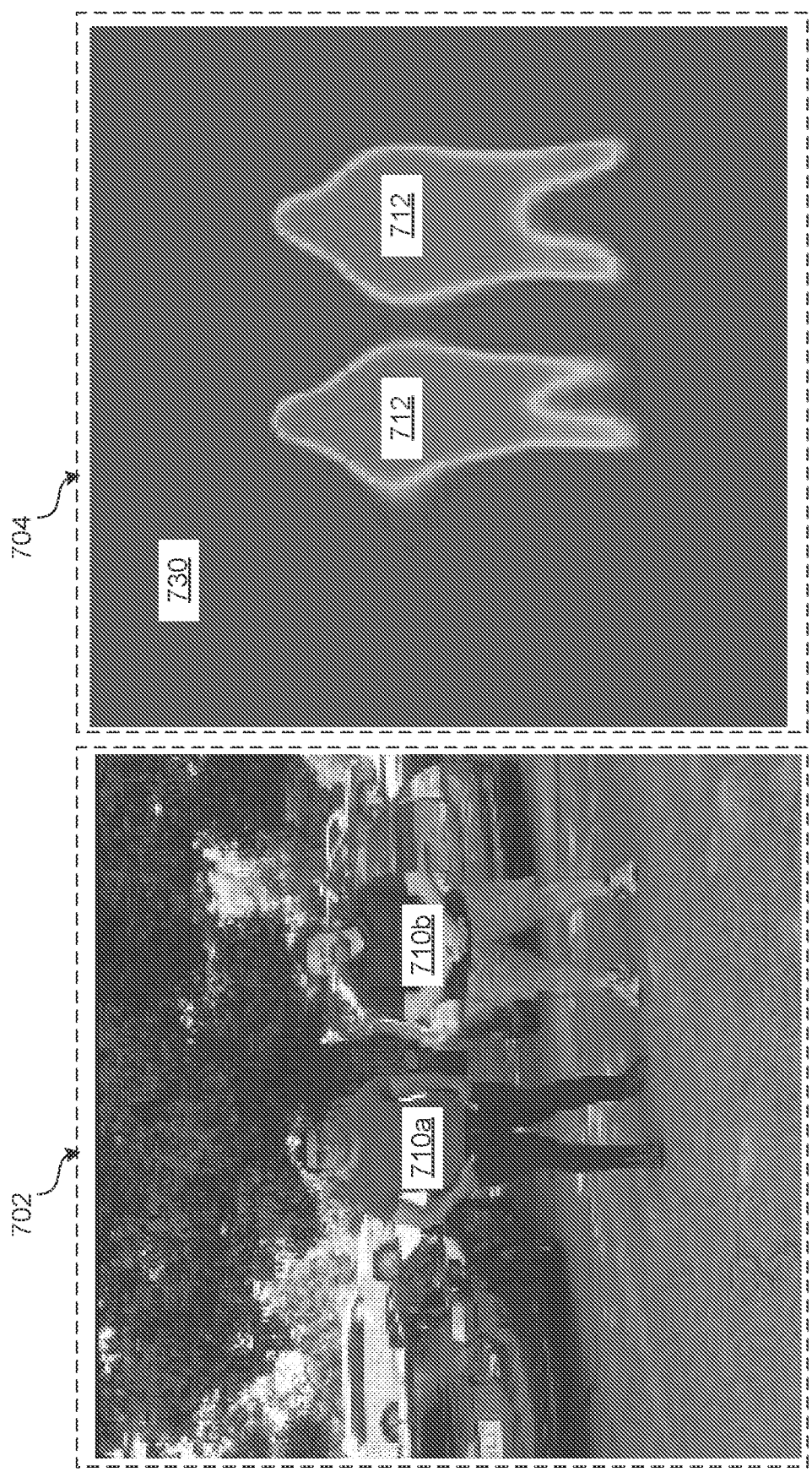
FIG. 7 shows a visualization representative of a dense per-pixel segmentation of a captured image.

A tracking system 140 may include an object detection system 142 for detecting and tracking various objects. Given one or more classes of objects (e.g., humans, buildings, cars, animals, etc.), the object detection system 142 may identify instances of the various classes of objects occurring in captured images of the physical environment. Outputs by the object detection system 142 can be parameterized in a few different ways. In some embodiments, the object detection system 142 processes received images and outputs a dense per-pixel segmentation, where each pixel is associated with a value corresponding to either an object class label (e.g., human, building, car, animal, etc.) and/or a likelihood of belonging to that object class. For example, FIG. 7 shows a visualization 704 of a dense per-pixel segmentation of a captured image 702 where pixels corresponding to detected objects 710*a*-*b* classified as humans are set apart from all other pixels in the image 702. Another parameterization may include resolving the image location of a detected object to a particular image coordinate (e.g., as shown at map 230 in FIG. 2), for example, based on centroid of the representation of the object in a received image.

In some embodiments, the object detection system 142 can utilize a deep convolutional neural network for object detection. For example, the input may be a digital image (e.g., image 702), and the output may be a tensor with the same spatial dimension. Each slice of the output tensor may represent a dense segmentation prediction, where each pixel's value is proportional to the likelihood of that pixel belonging to the class of object corresponding to the slice. For example, the visualization 704 shown in FIG. 7 may represent a particular slice of the aforementioned tensor where each pixel's value is proportional to the likelihood that the pixel corresponds with a human. In addition, the same deep convolutional neural network can also predicts the centroid locations for each detected instance, as described in the following section.

Instance Segmentation

A tracking system 140 may also include an instance segmentation system 144 for distinguishing between individual instances of objects detected by the object detection system 142. In some embodiments, the process of distinguishing individual instances of detected objects may include processing digital images captured by the UAV 100 to identify pixels belonging to one of a plurality of instances of a class of physical objects present in the physical environment and captured in the digital images. As previously described with respect to FIG. 7, a dense per-pixel segmentation algorithm can classify certain pixels in an image as corresponding to one or more classes of objects. This segmentation process output may allow a tracking system 140 to distinguish the objects represented in an image and the rest of the image (i.e., a background). For example, the visualization 704 distinguishes pixels that correspond to humans (e.g., included in region 712) from pixels that do not correspond to humans (e.g., included in region 730). However, this segmentation process does not necessarily distinguish between individual instances of the detected objects. A human viewing the visualization 704 may conclude that the pixels corresponding to humans in the detected image actually correspond to two separate humans; however, without further analysis, a tracking system may 140 be unable to make this distinction.

Figure 8:
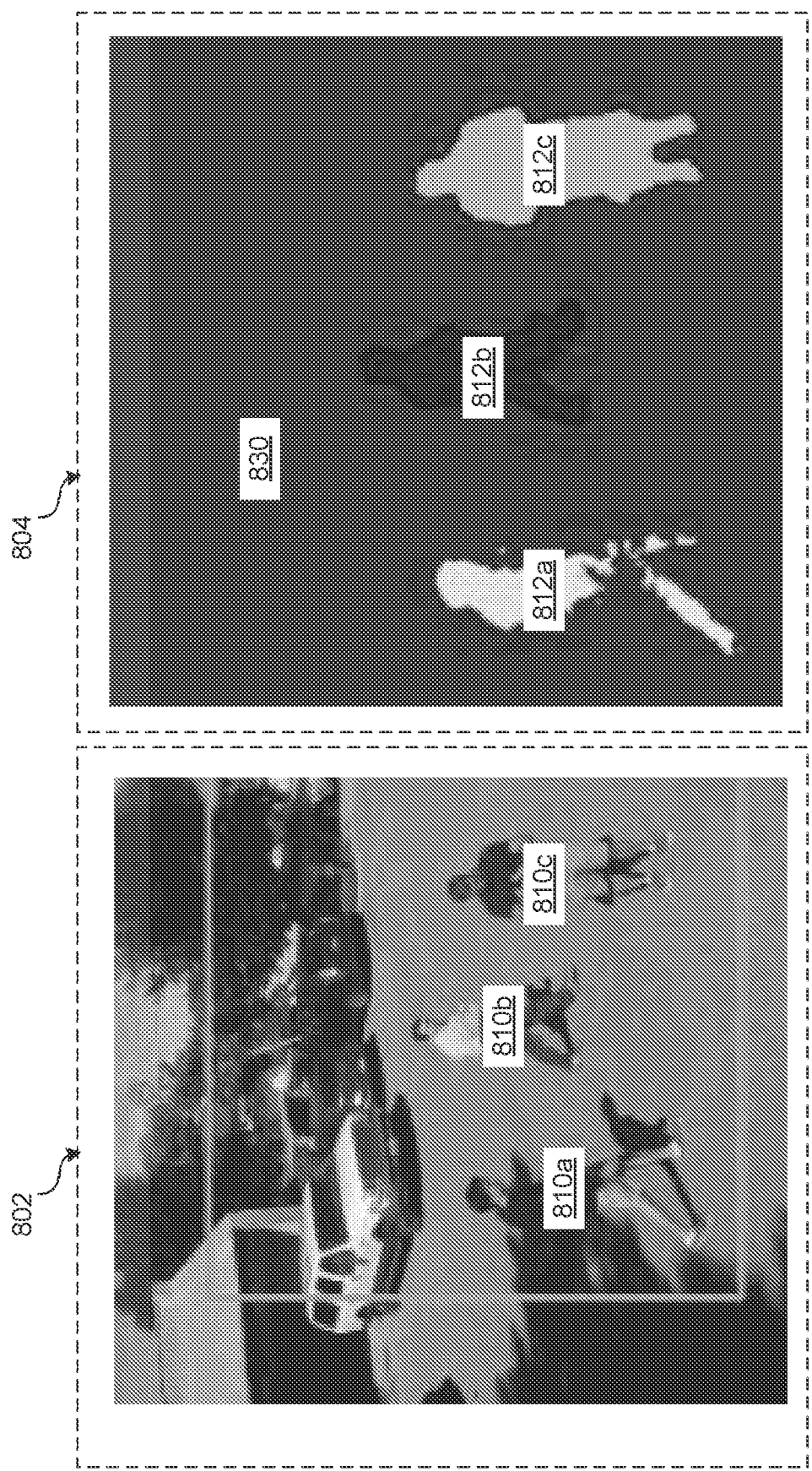
FIG. 8 shows a visualization representative of a an instance segmentation of a captured image.

Effective object tracking may involve distinguishing pixels that correspond to distinct instances of detected objects. This process is known as "instance segmentation." FIG. 8 shows an example visualization 804 of an instance segmentation output based on a captured image 802. Similar to the dense per-pixel segmentation process described with respect to FIG. 7, the output represented by visualization 804 distinguishes pixels (e.g., included in regions 812*a*-*c*) that correspond to detected objects 810*a*-*c* of a particular class of objects (in this case humans) from pixels that do not correspond to such objects (e.g., included in region 830). Notably, the instance segmentation process goes a step further to distinguish pixels corresponding to individual instances of the detected objects from each other. For example, pixels in region 812*a* correspond to a detected instance of a human 810*a*, pixels in region 812*b* correspond to a detected instance of a human 810*b*, and pixels in region 812*c* correspond to a detected instance of a human 810*c*.

Distinguishing between instances of detected objects may be based on an analysis, by the instance segmentation system 144, of pixels corresponding to detected objects. For example, a grouping method may be applied by the instance segmentation system 144 to associate pixels corresponding to a particular class of object to a particular instance of that class by selecting pixels that are substantially similar to certain other pixels corresponding to that instance, pixels that are spatially clustered, pixel clusters that fit an appearance-based model for the object class, etc. Again, this process may involve applying a deep convolutional neural network to distinguish individual instances of detected objects.

Identity Recognition

Instance segmentation may associate pixels corresponding to particular instances of objects; however, such associations may not be temporally consistent. Consider again, the example described with respect to FIG. 8. As illustrated in FIG. 8, a tracking system 140 has identified three instances of a certain class of objects (i.e., humans) by applying an instance segmentation process to a captured image 802 of the physical environment. This example captured image 802 may represent only one frame in a sequence of frames of captured video. When a second frame is received, the tracking system 140 may not be able to recognize newly identified object instances as corresponding to the same three people 810*a-c* as captured in image 802.

To address this issue, the tracking system 140 can include an identity recognition system 146. An identity recognition system 146 may process received inputs (e.g., captured images) to learn the appearances of instances of certain objects (e.g., of particular people). Specifically, the identity recognition system 146 may apply a machine-learning appearance-based model to digital images captured by one or more image capture devices 114/115 associated with a UAV 100. Instance segmentations identified based on processing of captured images can then be compared against such appearance-based models to resolve unique identities for one or more of the detected objects.

Identity recognition can be useful for various different tasks related to object tracking. As previously alluded to, recognizing the unique identities of detected objects allows for temporal consistency. Further, identity recognition can enable the tracking of multiple different objects (as will be described in more detail). Identity recognition may also facilitate object persistence that enables re-acquisition of previously tracked objects that fell out of view due to limited FOV of the image capture devices, motion of the object, and/or occlusion by another object. Identity recognition can also be applied to perform certain identity-specific behaviors or actions, such as recording video when a particular person is in view.

In some embodiments, an identity recognition process may employ a deep convolutional neural network to learn one or more effective appearance-based models for certain objects. In some embodiments, the neural network can be trained to learn a distance metric that returns a low distance value for image crops belonging to the same instance of an object (e.g. a person), and a high distance value otherwise.

In some embodiments, an identity recognition process may also include learning appearances of individual instances of objects such as people. When tracking humans, a tracking system 140 may be configured to associate identities of the humans, either through user-input data or external data sources such as images associated with individuals available on social media. Such data can be combined with detailed facial recognition processes based on images received from any of the one or more image capture devices 114/115 onboard the UAV 100. In some embodiments, an identity recognition process may focus on one or more key individuals. For example, a tracking system 140 associated with a UAV 100 may specifically focus on learning the identity of a designated owner of the UAV 100 and retain and/or improve its knowledge between flights for tracking, navigation, and/or other purposes such as access control.

Multi-Object Tracking

In some embodiments, a tracking system 140 may be configured to focus tracking on a specific object detected in images captured by the one or more image capture devices 114/115 of a UAV 100. In such a single-object tracking approach, an identified object (e.g., a person) is designated for tracking while all other objects (e.g., other people, trees, buildings, landscape features, etc.) are treated as distractors and ignored. While useful in some contexts, a single-object tracking approach may have some disadvantages. For example, an overlap in trajectory, from the point of view of an image capture device, of a tracked object and a distractor object may lead to an inadvertent switch in the object being tracked such that the tracking system 140 begins tracking the distractor instead. Similarly, spatially close false positives by an object detector can also lead to inadvertent switches in tracking.

A multi-object tracking approach addresses these shortcomings, and introduces a few additional benefits. In some embodiments, a unique track is associated with each object detected in the images captured by the one or more image capture devices 114/115. In some cases, it may not be practical, from a computing standpoint, to associate a unique track with every single object that is captured in the images. For example, a given image may include hundreds of objects, including minor features such as rocks or leaves of trees. Instead, unique tracks may be associate with certain classes of objects that may be of interest from a tracing standpoint. For example, the tracking system 140 may be configured to associate a unique track with every object detected that belongs to a class that is generally mobile (e.g., people, animals, vehicles, etc.).

Each unique track may include an estimate for the spatial location and movement of the object being tracked (e.g., using the spatiotemporal factor graph described earlier) as well as its appearance (e.g., using the identity recognition feature). Instead of pooling together all other distractors (i.e., as may be performed in a single object tracking approach), the tracking system 140 can learn to distinguish between the multiple individual tracked objects. By doing so, the tracking system 140 may render inadvertent identity switches less likely. Similarly, false positives by the object detector can be more robustly rejected as they will tend to not be consistent with any of the unique tracks.

An aspect to consider when performing multi-object tracking includes the association problem. In other words, given a set of object detections based on captured images (including parameterization by 3D location and regions in the image corresponding to segmentation), an issue arises regarding how to associate each of the set of object detections with corresponding tracks. To address the association problem, the tracking system 140 can be configured to associate one of a plurality of detected objects with one of a plurality of estimated object tracks based on a relationship between a detected object and an estimate object track. Specifically, this process may involve computing a "cost" value for one or more pairs of object detections and estimate object tracks. The computed cost values can take into account, for example, the spatial distance between a current location (e.g., in 3D space and/or image space) of a given object detection and a current estimate of a given track (e.g., in 3D space and/or in image space), an uncertainty of the current estimate of the given track, a difference between a given detected object's appearance and a given track's appearance estimate, and/or any other factors that may tend to suggest an association between a given detected object and given track. In some embodiments, multiple cost values are computed based on various different factors and fused into a single scalar value that can then be treated as a measure of how well a given detected object matches a given track. The aforementioned cost formulation can then be used to determine an optimal association between a detected object and a corresponding track by treating the cost formulation as an instance of a minimum cost perfect bipartite matching problem, which can be solved using, for example, the Hungarian algorithm.

Object State Estimation

Is some embodiments, effective object tracking by a tracking system 140 may be improved by incorporating information regarding a state of an object. For example, a detected object such as a human may be associated with any one or more defined states. A state in this context may include an activity by the object such as sitting, standing, walking, running, or jumping. In some embodiments, one or more perception inputs (e.g., visual inputs from image capture devices 114/115) may be used to estimate one or more parameters associated with detected objects. The estimated parameters may include an activity type, motion capabilities, trajectory heading, contextual location (e.g., indoors vs. outdoors), interaction with other detected objects (e.g., two people walking together, a dog on a leash held by a person, a trailer pulled by a car, etc.), and any other semantic attributes.

Generally, object state estimation may be applied to estimate one or more parameters associated with a state of a detected object based on perception inputs (e.g., images of the detected object captured by one or more image capture devices 114/115 onboard a UAV 100 or sensor data from any other sensors onboard the UAV 100). The estimated parameters may then be applied to assist in predicting the motion of the detected object and thereby assist in tracking the detected object. For example, future trajectory estimates may differ for a detected human depending on whether the detected human is walking, running, jumping, riding a bicycle, riding in a car, etc. In some embodiments, deep convolutional neural networks may be applied to generate the parameter estimates based on multiple data sources (e.g., the perception inputs) to assist in generating future trajectory estimates and thereby assist in tracking.

Predicting Future Trajectories of Detected Objects

As previously alluded to, a tracking system 140 may be configured to estimate (i.e., predict) a future trajectory of a detected object based on past trajectory measurements and/or estimates, current perception inputs, motion models, and any other information (e.g., object state estimates). Predicting a future trajectory of a detected object is particularly useful for autonomous navigation by the UAV 100. Effective autonomous navigation by the UAV 100 may depend on anticipation of future conditions just as much as current conditions in the physical environment. Through a motion planning process, a navigation system of the UAV 100 may generate control commands configured to cause the UAV 100 to maneuver, for example, to avoid a collision, maintain separation with a tracked object in motion, and/or satisfy any other navigation objectives.

Predicting a future trajectory of a detected object is generally a relatively difficult problem to solve. The problem can be simplified for objects that are in motion according to a known and predictable motion model. For example, an object in free fall is expected to continue along a previous trajectory while accelerating at rate based on a known gravitational constant and other known factors (e.g., wind resistance). In such cases, the problem of generating a prediction of a future trajectory can be simplified to merely propagating past and current motion according to a known or predictable motion model associated with the object. Objects may of course deviate from a predicted trajectory generated based on such assumptions for a number of reasons (e.g., due to collision with another object). However, the predicted trajectories may still be useful for motion planning and/or tracking purposes.

Dynamic objects such as people and animals, present a more difficult challenge when predicting future trajectories because the motion of such objects is generally based on the environment and their own free will. To address such challenges, a tracking system 140 may be configured to take accurate measurements of the current position and motion of an object and use differentiated velocities and/or accelerations to predict a trajectory a short time (e.g., seconds) into the future and continually update such prediction as new measurements are taken. Further, the tracking system 140 may also use semantic information gathered from an analysis of captured images as cues to aid in generating predicted trajectories. For example, a tracking system 140 may determine that a detected object is a person on a bicycle traveling along a road. With this semantic information, the tracking system 140 may form an assumption that the tracked object is likely to continue along a trajectory that roughly coincides with a path of the road. As another related example, the tracking system 140 may determine that the person has begun turning the handlebars of the bicycle to the left. With this semantic information, the tracking system 140 may form an assumption that the tracked object will likely turn to the left before receiving any positional measurements that expose this motion. Another example, particularly relevant to autonomous objects such as people or animals is to assume that that the object will tend to avoid collisions with other objects. For example, the tracking system 140 may determine a tracked object is a person heading on a trajectory that will lead to a collision with another object such as a light pole. With this semantic information, the tracking system 140 may form an assumption that the tracked object is likely to alter its current trajectory at some point before the collision occurs. A person having ordinary skill will recognize that these are only examples of how semantic information may be utilized as a cue to guide prediction of future trajectories for certain objects.

Frame-to-Frame Tracking

In addition to performing an object detection process in one or more captured images per time frame, the tracking system 140 may also be configured to perform a frame-to-frame tracking process, for example, to detect motion of a particular set or region of pixels in images at subsequent time frames (e.g., video frames). Such a process may involve applying a mean-shift algorithm, a correlation filter, and/or a deep network. In some embodiments, frame-to-frame tracking may be applied by a system that is separate from the object detection system 142 wherein results from the frame-to-frame tracking are fused into a spatiotemporal factor graph. Alternatively, or in addition, an object detection system 142 may perform frame-to-frame tracking if, for example, the system has sufficient available computing resources (e.g., memory). For example, an object detection system 142 may apply frame-to-frame tracking through recurrence in a deep network and/or by passing in multiple images at a time. A frame-to-frame tracking process and object detection process can also be configured to complement each other, with one resetting the other when a failure occurs.

Disparity Segmentation

As previously discussed, the object detection system 142 may be configured to process images (e.g., the raw pixel data) received from one or more image capture devices 114/115 onboard a UAV 100. Alternatively, or in addition, the object detection system 142 may also be configured to operate by processing disparity images. A "disparity image" may generally be understood as an image representative of a disparity between two or more corresponding images. For example, a stereo pair of images (e.g., left image and right image) captured by a stereoscopic image capture device will exhibit an inherent offset due to the slight difference in position of the two or more cameras associated with the stereoscopic image capture device. Despite the offset, at least some of the objects appearing in one image should also appear in the other image; however, the image locations of pixels corresponding to such objects will differ. By matching pixels in one image with corresponding pixels in the other and calculating the distance between these corresponding pixels, a disparity image can be generated with pixel values that are based on the distance calculations. Such a disparity image will tend to highlight regions of an image that correspond to objects in the physical environment since the pixels corresponding to the object will have similar disparities due to the object's 3D location in space. Accordingly, a disparity image, that may have been generated by processing two or more images according to a separate stereo algorithm, may provide useful cues to guide an object detection system 142 in detecting objects in the physical environment. In many situations, particularly where harsh lighting is present, a disparity image may actually provide stronger cues about the location of objects than an image captured from the image capture devices 114/115. As mentioned, disparity images may be computed with a separate stereo algorithm. Alternatively, or in addition, disparity images may be output as part of the same deep network applied by the object detection system 142. Disparity images may be used for object detection separately from the images received from the image capture devices 114/115, or they may be combined into a single network for joint inference.

Amodal Segmentation

In general, an object detection system 142 and/or an associated instance segmentation system 144 may be primary concerned with determining which pixels in a given image correspond to each object instance. However, these systems may not consider portions of a given object that are not actually captured in a given image. For example, pixels that would otherwise correspond with an occluded portion of an object (e.g., a person partially occluded by a tree) may not be labeled as corresponding to the object. This can be disadvantageous for object detection, instance segmentation, and/or identity recognition because the size and shape of the object may appear in the captured image to be distorted due to the occlusion. To address this issue, the object detection system 142 and/or instance segmentation system 144 may be configured to imply a segmentation of an object instance in a captured image even if that object instance is occluded by other object instances. The object detection system 142 and/or instance segmentation system 144 may additionally be configured to determine which of the pixels associated with an object instance correspond with an occluded portion of that object instance. This process is generally referred to as "amodal segmentation" in that the segmentation process takes into consideration the whole of a physical object even if parts of the physical object are not necessarily perceived, for example, received images captured by the image capture devices 114/115. Amodal segmentation may be particularly advantageous when performing identity recognition and in a tracking system 140 configured for multi-object tracking.

Object Permanence

Loss of visual contact is to be expected when tracking an object in motion through a physical environment. A tracking system 140 based primarily on visual inputs (e.g., images captured by image capture devices 114/115) may lose a track on an object when visual contact is lost (e.g., due to occlusion by another object or by the object leaving a FOV of an image capture device 114/115). In such cases, the tracking system 140 may become uncertain of the object's location and thereby declare the object lost. Human pilots generally do not have this issue, particularly in the case of momentary occlusions, due to the notion of object permanence. Object permanence assumes that, given certain physical constraints of matter, an object cannot suddenly disappear or instantly teleport to another location. Based on this assumption, if it is clear that all escape paths would have been clearly visible, then an object is likely to remain in an occluded volume. This situation is most clear when there is single occluding object (e.g., boulder) on flat ground with free space all around. If a tracked object in motion suddenly disappears in the captured image at a location of another object (e.g., the bolder), then it can be assumed that the object remains at a position occluded by the other object and that the tracked object will emerge along one of one or more possible escape paths. In some embodiments, the tracking system 140 may be configured to implement an algorithm that bounds the growth of uncertainty in the tracked objects location given this concept. In other words, when visual contact with a tracked object is lost at a particular position, the tracking system 140 can bound the uncertainty in the object's position to the last observed position and one or more possible escape paths given a last observed trajectory. A possible implementation of this concept may include generating, by the tracking system 140, an occupancy map that is carved out by stereo and the segmentations with a particle filter on possible escape paths.

Augmented Reality Applications Based on Object Tracking

In some embodiments, information regarding objects in the physical environment gathered and/or generated by a tracking system 140 can be utilized to generate and display "augmentations" to tracked objects, for example, via associated display devices. Devices configured for augmented reality (AR devices) can deliver to a user a direct or indirect view of a physical environment which includes objects that are augmented (or supplemented) by computer-generated sensory outputs such as sound, video, graphics, or any other data that may augment (or supplement) a user's perception of the physical environment. For example, data gathered or generated by a tracking system 140 regarding a tracked object in the physical environment can be displayed to a user in the form of graphical overlays via an AR device while the UAV 100 is in flight through the physical environment and actively tracking the object and/or as an augmentation to video recorded by the UAV 100 after the flight has completed. Examples of AR devices that may be utilized to implement such functionality include smartphones, tablet computers, laptops, head mounted display devices (e.g., Microsoft HoloLens™, Google Glass™), virtual retinal display devices, heads up display (HUD) devices in vehicles, etc. For example, the previously mentioned mobile device 104 may be configured as an AR device. Note that for illustrative simplicity the term AR device is used herein to describe any type of device capable of presenting augmentations (visible, audible, tactile, etc.) to a user. The term "AR device" shall be understood to also include devices not commonly referred to as AR devices such as virtual reality (VR) headset devices (e.g., Oculus Rift™).

Figure 9:
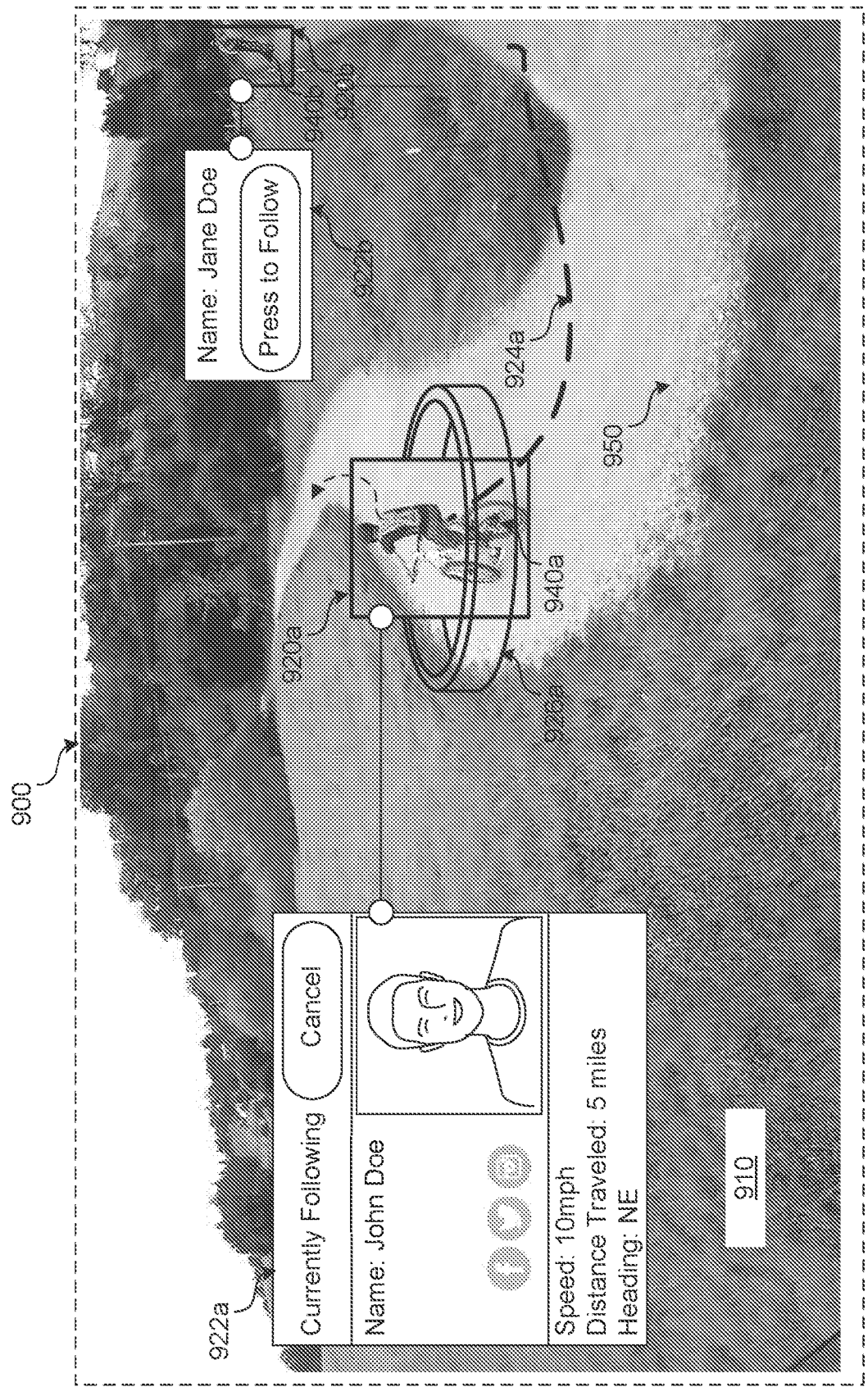
FIG. 9 shows an example view of a physical environment with displayed augmentations based on information from a tracking system.

FIG. 9 shows an example view 900 of a physical environment 910 as presented at a display of an AR device. The view 900 of the physical environment 910 shown in FIG. 9 may be generated based on images captured by one or more image capture devices 114/115 of a UAV 100 and be displayed to a user via the AR device in real time or near real time as the UAV 100 is flying through the physical environment capturing the images. As shown in FIG. 9, one or more augmentations may be presented to the user in the form of augmenting graphical overlays 920a, 922a, 924a, 926a, and 920b associated with objects (e.g., bikers 940a and 940b) in the physical environment 910. For example, in an embodiment, the aforementioned augmenting graphical overlays may be generated and composited with video captured by UAV 100 as the UAV 100 tracks biker 940a. The composite including the captured video and the augmenting graphical overlays may be displayed to the user via a display of the AR device (e.g., a smartphone). In other embodiments, the AR device may include a transparent display (e.g., a head mounted display) through which the user can view the surrounding physical environment 910. The transparent display may comprise a waveguide element made of a light-transmissive material through which projected images of one or more of the aforementioned augmenting graphical overlays are propagated and directed at the eyes of the user such that the projected images appear to the user to overlay the user's view of the physical environment 910 and correspond with particular objects or points in the physical environment.

In some embodiments augmentations may include labels with information associated with objects detected in the physical environment 910. For example, FIG. 9 illustrates a scenario in which UAV 100 has detected and is tracking a first biker 940a and a second biker 940b. In response, one or more augmenting graphical overlays associated with the tracked objects may be displayed via the AR device at points corresponding to the locations of the bikers 940a-b as they appear in the captured image.

In some embodiments, augmentations may indicate specific object instances that are tracked by UAV 100. In the illustrative example provided in FIG. 9, such augmentations are presented as augmenting graphical overlays 920a-b in the form of boxes that surround the specific object instances 940a-b (respectively). This is just an example provided for illustrative purposes. Indications of object instances may be presented using other types of augmentations (visual or otherwise). For example, object instances and their segmentations may alternatively be visually displayed similar to the segmentation map 804 described with respect to FIG. 8.

In some embodiments, augmentations may include identifying information associated with detected objects. For example, augmenting graphical overlays 922a-b include names of the tracked bikers 940a-b (respectively). Further, augmenting graphical overlay 922a includes a picture of biker 940a. Recall that the identities of tracked individuals may have been resolved by the tracking system 140 as part of an identity recognition process. In some embodiments, information such as the picture of the biker 940a may be automatically pulled from an external source such as a social media platform (e.g., Facebook™, Twitter™, Instagram™, etc.). Although not shown in FIG. 9, augmentations may also include avatars associated with identified people. Avatars may include 3D graphical reconstructions of the tracked person (e.g., based on captured images and other sensor data), generative "bitmoji" from instance segmentations, or any other type of generated graphics representative of tracked objects.

In some embodiments, augmentation may include information regarding an activity or state of the tracked object. For example, augmenting graphical overlay 922a includes information regarding the speed, distance traveled, and current heading of biker 940a. Other information regarding the activity of a tracked object may similarly be displayed.

In some embodiments, augmentations may include visual effects that track or interact with tracked objects. For example, FIG. 9 shows an augmenting graphical overlay 924a in the form of a projection of a 3D trajectory (e.g., current, past, and/or future) associated with biker 940a. In some embodiments, trajectories of multiple tracked objects may be presented as augmentations. Although not shown in FIG. 9, augmentations may also include other visual effects such as halos, fireballs, dropped shadows, ghosting, multi-frame snapshots, etc.

Semantic knowledge of objects in the physical environment may also enable new AR user interaction paradigms. In other words, certain augmentations may be interactive and allow a user to control certain aspects of the flight of the UAV 100 and/or image capture by the UAV 100. Illustrative examples of interactive augmentations may include an interactive follow button that appears above moving objects. For example, in the scenario depicted in FIG. 9, a UAV is tracking the motion of both bikers 940a and 940b, but is actively following (i.e., at a substantially constant separation distance) the first biker 940a. This is indicated in the augmenting graphical overlay 922a that states "currently following." Note that a corresponding overlay 922b associated with the second biker 940b includes an interactive element (e.g., a "push to follow" button), that when pressed by a user, would cause the UAV 100 to stop following biker 940a and begin following biker 940b. Similarly, overlay 922a includes an interactive element (e.g., a "cancel" button), that when pressed by a user, would cause the UAV 100 to stop following biker 940a. In such a situation, the UAV 100 may revert to some default autonomous navigation objective, for example, following the path the bikers are traveling on but not any one biker in particular.

Other similar interactive augmentations may also be implemented. For example, although not shown in FIG. 9, users may inspect certain objects, for example, by interacting with the visual depictions of the objects as presented by the AR device. For example, if the AR device includes a touch screen display, a user may cause the UAV 100 to follow the object simply by touching a region of the screen corresponding to the displayed object. This may also be applied to static objects that are not in motion. For example, by interacting with a region of the screen of an AR device corresponding to the displayed path 950, an AR interface may display information regarding the path (e.g., source, destination, length, material, map overlay, etc.) or may cause the UAV to travel along the path at a particular altitude.

The size and geometry of detected objects may be taken into consideration when presenting augmentations. For example, in some embodiments, an interactive control element may be displayed as a ring about a detected object in an AR display. For example, FIG. 9 shows a control element 926a shown as a ring that appears to encircle the first biker 940. The control element 926a may respond to user interactions to control an angle at which UAV 100 captures images of the biker 940a. For example, in a touch screen display context, a user may swipe their finger over the control element 926a to cause the UAV 100 to revolve about the biker 940a (e.g., at a substantially constant range) even as the biker 940a is in motion. Other similar interactive elements may be implemented to allow the user to zoom image captured in or out, pan from side to side, etc.

Example Localization Systems

Figure 10:
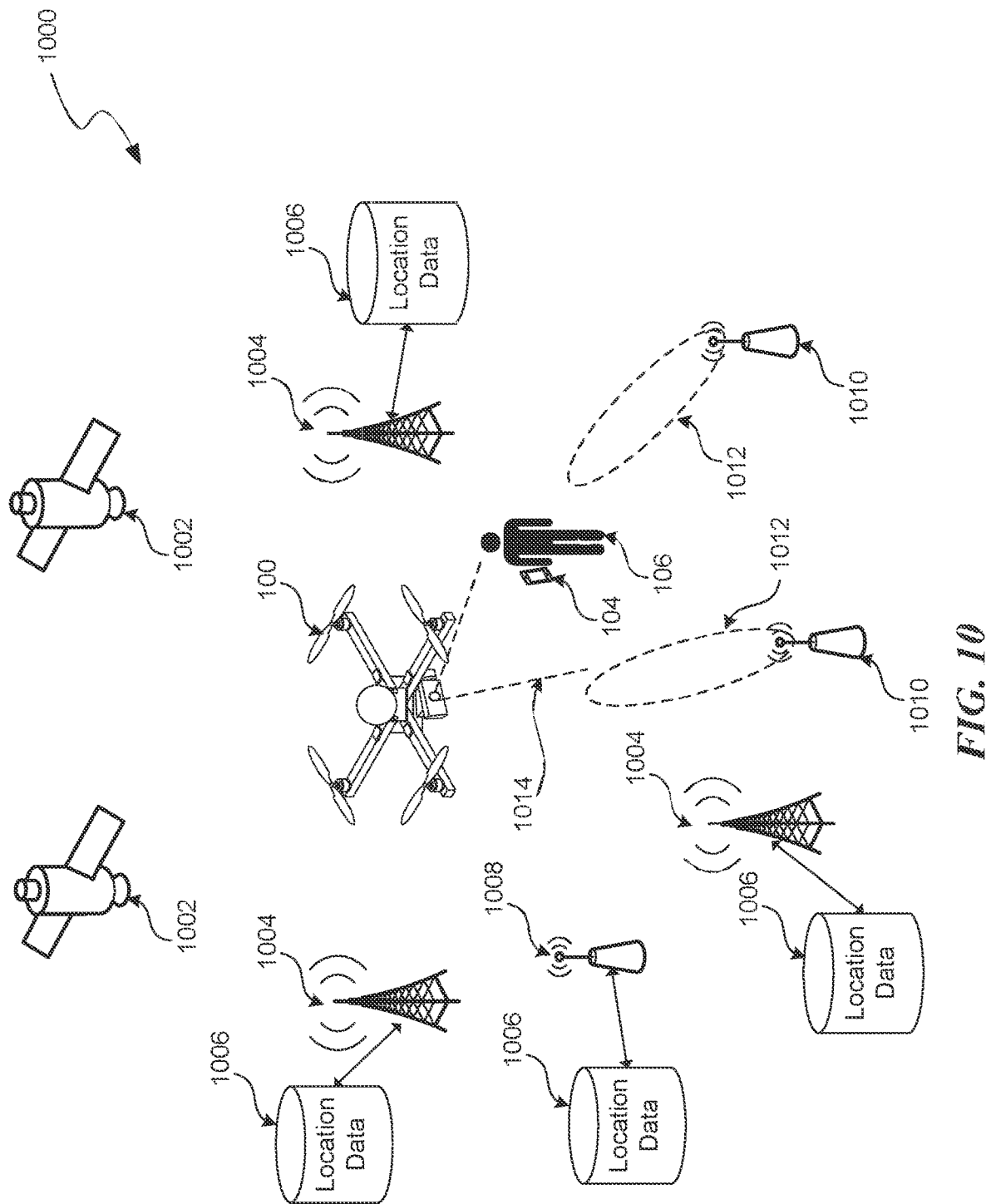
FIG. 10 shows a diagram of an example localization system with which at least some operations described in this disclosure can be implemented.

A navigation system 120 of a UAV 100 may employ any number of other systems and techniques for localization. FIG. 10 shows an illustration of an example localization system 1000 that may be utilized to guide autonomous navigation of a vehicle such as UAV 100. In some embodiments, the positions and/or orientations of the UAV 100 and various other physical objects in the physical environment can be estimated using any one or more of the subsystems illustrated in FIG. 10. By tracking changes in the positions and/or orientations over time (continuously or at regular or irregular time intervals (i.e., continually)), the motions (e.g., velocity, acceleration, etc.) of UAV 100 and other objects may also be estimated. Accordingly, any systems described herein for determining position and/or orientation may similarly be employed for estimating motion.

As shown in FIG. 10, the example localization system 1000 may include the UAV 100, a global positioning system (GPS) comprising multiple GPS satellites 1002, a cellular system comprising multiple cellular antennae 1004 (with access to sources of localization data 1006), a Wi-Fi system comprising multiple Wi-Fi access points 1008 (with access to sources of localization data 1006), and/or a mobile device 104 operated by a user 1.

Satellite-based positioning systems such as GPS can provide effective global position estimates (within a few meters) of any device equipped with a receiver. For example, as shown in FIG. 10, signals received at a UAV 100 from satellites of a GPS system 1002 can be utilized to estimate a global position of the UAV 100. Similarly, positions relative to other devices (e.g., a mobile device 104) can be determined by communicating (e.g. over a wireless communication link 116) and comparing the global positions of the other devices.

Localization techniques can also be applied in the context of various communications systems that are configured to transmit communications signals wirelessly. For example, various localization techniques can be applied to estimate a position of UAV 100 based on signals transmitted between the UAV 100 and any of cellular antennae 1004 of a cellular system or Wi-Fi access points 1008, 1010 of a Wi-Fi system. Known positioning techniques that can be implemented include, for example, time of arrival (ToA), time difference of arrival (TDoA), round trip time (RTT), angle of Arrival (AoA), and received signal strength (RSS). Moreover, hybrid positioning systems implementing multiple techniques such as TDoA and AoA, ToA and RSS, or TDoA and RSS can be used to improve the accuracy.

Some Wi-Fi standards, such as 802.11ac, allow for RF signal beamforming (i.e., directional signal transmission using phased-shifted antenna arrays) from transmitting Wi-Fi routers. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 10 by dotted lines 1012 emanating from WiFi routers 1010.

An inertial measurement unit (IMU) may be used to estimate position and/or orientation of device. An IMU is a device that measures a vehicle's angular velocity and linear acceleration. These measurements can be fused with other sources of information (e.g., those discussed above) to accurately infer velocity, orientation, and sensor calibrations. As described herein, a UAV 100 may include one or more IMUs. Using a method commonly referred to as "dead reckoning," an IMU (or associated systems) may estimate a current position based on previously measured positions using measured accelerations and the time elapsed from the previously measured positions. While effective to an extent, the accuracy achieved through dead reckoning based on measurements from an IMU quickly degrades due to the cumulative effect of errors in each predicted current position. Errors are further compounded by the fact that each predicted position is based on a calculated integral of the measured velocity. To counter such effects, an embodiment utilizing localization using an IMU may include localization data from other sources (e.g., the GPS, Wi-Fi, and cellular systems described above) to continually update the last known position and/or orientation of the object. Further, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Kalman filters are commonly applied in the area of aircraft navigation, guidance, and controls.

Computer vision may be used to estimate the position and/or orientation of a capturing camera (and by extension a device to which the camera is coupled) as well as other objects in the physical environment. The term, "computer vision" in this context may generally refer to any method of acquiring, processing, analyzing and "understanding" captured images. Computer vision may be used to estimate position and/or orientation using a number of different methods. For example, in some embodiments, raw image data received from one or more image capture devices (onboard or remote from the UAV 100) may be received and processed to correct for certain variables (e.g., differences in camera orientation and/or intrinsic parameters (e.g., lens variations)). As previously discussed with respect to FIG. 1A, the UAV 100 may include two or more image capture devices 114/115. By comparing the captured image from two or more vantage points (e.g., at different time steps from an image capture device in motion), a system employing computer vision may calculate estimates for the position and/or orientation of a vehicle on which the image capture device is mounted (e.g., UAV 100) and/or of captured objects in the physical environment (e.g., a tree, building, etc.).

Figure 11:
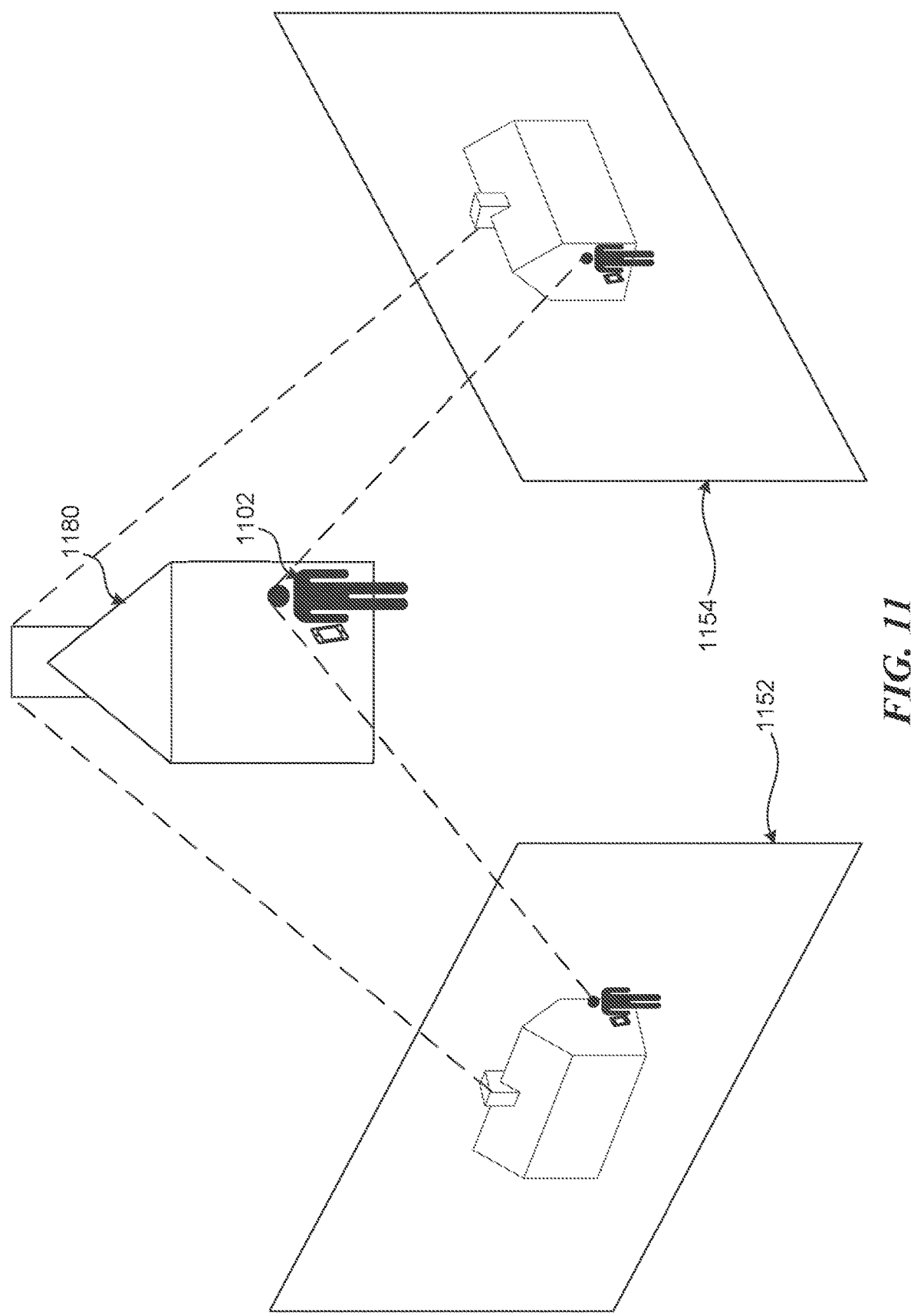
FIG. 11 shows a diagram illustrating the concept of visual odometry based on captured images.

Computer vision can be applied to estimate position and/or orientation using a process referred to as "visual odometry." FIG. 11 illustrates the working concept behind visual odometry at a high level. A plurality of images are captured in sequence as an image capture device moves through space. Due to the movement of the image capture device, the images captured of the surrounding physical environment change from frame to frame. In FIG. 11, this is illustrated by initial image capture FOV 1152 and a subsequent image capture FOV 1154 captured as the image capture device has moved from a first position to a second position over a period of time. In both images, the image capture device may capture real world physical objects, for example, the house 1180 and/or the person 1102. Computer vision techniques are applied to the sequence of images to detect and match features of physical objects captured in the FOV of the image capture device. For example, a system employing computer vision may search for correspondences in the pixels of digital images that have overlapping FOV. The correspondences may be identified using a number of different methods such as correlation-based and feature-based methods. As shown in, in FIG. 11, features such as the head of a human subject 1102 or the corner of the chimney on the house 1180 can be identified, matched, and thereby tracked. By incorporating sensor data from an IMU (or accelerometer(s) or gyroscope(s)) associated with the image capture device to the tracked features of the image capture, estimations may be made for the position and/or orientation of the image capture relative to the objects 1180, 1102 captured in the images. Further, these estimates can be used to calibrate various other systems, for example, through estimating differences in camera orientation and/or intrinsic parameters (e.g., lens variations) or IMU biases and/or orientation. Visual odometry may be applied at both the UAV 100 and any other computing device such as a mobile device 104 to estimate the position and/or orientation of the UAV 100 and/or other objects. Further, by communicating the estimates between the systems (e.g., via a wireless communication link 116) estimates may be calculated for the respective positions and/or orientations relative to each other. Position and/or orientation estimates based in part on sensor data from an on board IMU may introduce error propagation issues. As previously stated, optimization techniques may be applied to such estimates to counter uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Such estimation algorithms can be similarly applied to produce smooth motion estimations.

In some embodiments, data received from sensors onboard UAV 100 can be processed to generate a 3D map of the surrounding physical environment while estimating the relative positions and/or orientations of the UAV 100 and/or other objects within the physical environment. This process is sometimes referred to as simultaneous localization and mapping (SLAM). In such embodiments, using computer vision processing, a system in accordance with the present teaching can search for dense correspondence between images with overlapping FOV (e.g., images taken during sequential time steps and/or stereoscopic images taken at the same time step). The system can then use the dense correspondences to estimate a depth or distance to each pixel represented in each image. These depth estimates can then be used to continually update a generated 3D model of the physical environment taking into account motion estimates for the image capture device (i.e., UAV 100) through the physical environment.

Figure 12:
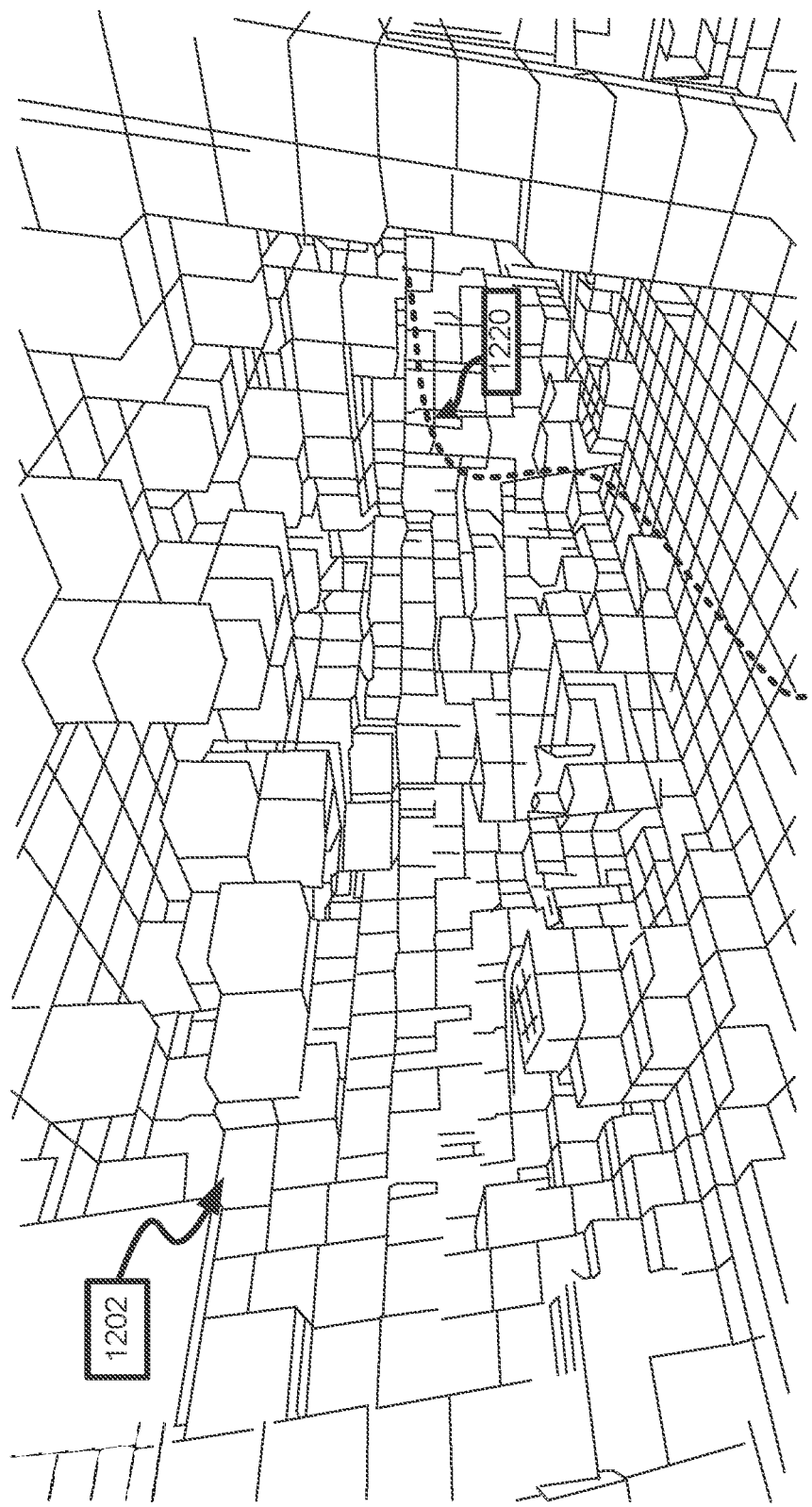
FIG. 12 shows an example view of a 3D occupancy map of a physical environment.

In some embodiments, a 3D model of the surrounding physical environment may be generated as a 3D occupancy map that includes multiple voxels with each voxel corresponding to a 3D volume of space in the physical environment that is at least partially occupied by a physical object. For example, FIG. 12 shows an example view of a 3D occupancy map 1202 of a physical environment including multiple cubical voxels. Each of the voxels in the 3D occupancy map 1202 correspond to a space in the physical environment that is at least partially occupied by a physical object. A navigation system 120 of a UAV 100 can be configured to navigate the physical environment by planning a 3D trajectory 1220 through the 3D occupancy map 1202 that avoids the voxels. In some embodiments, this 3D trajectory 1220 planned using the 3D occupancy map 1202 can be optimized by applying an image space motion planning process. In such an embodiment, the planned 3D trajectory 1220 of the UAV 100 is projected into an image space of captured images for analysis relative to certain identified high cost regions (e.g., regions having invalid depth estimates).

Computer vision may also be applied using sensing technologies other than cameras, such as LIDAR. For example, a UAV 100 equipped with LIDAR may emit one or more laser beams in a scan up to 360 degrees around the UAV 100. Light received by the UAV 100 as the laser beams reflect off physical objects in the surrounding physical world may be analyzed to construct a real time 3D computer model of the surrounding physical world. Depth sensing through the use of LIDAR may in some embodiments augment depth sensing through pixel correspondence as described earlier. Further, images captured by cameras (e.g., as described earlier) may be combined with the laser constructed 3D models to form textured 3D models that may be further analyzed in real time or near real time for physical object recognition (e.g., by using computer vision algorithms).

The computer vision-aided localization techniques described above may calculate the position and/or orientation of objects in the physical world in addition to the position and/or orientation of the UAV 100. The estimated positions and/or orientations of these objects may then be fed into a motion planning system 130 of the navigation system 120 to plan paths that avoid obstacles while satisfying certain navigation objectives (e.g., travel to a particular location, follow a tracked objects, etc.). In addition, in some embodiments, a navigation system 120 may incorporate data from proximity sensors (e.g., electromagnetic, acoustic, and/or optics based) to estimate obstacle positions with more accuracy. Further refinement may be possible with the use of stereoscopic computer vision with multiple cameras, as described earlier.

The localization system 1000 of FIG. 10 (including all of the associated subsystems as previously described) is only one example of a system configured to estimate positions and/or orientations of a UAV 100 and other objects in the physical environment. A localization system 1000 may include more or fewer components than shown, may combine two or more components, or may have a different configuration or arrangement of the components. Some of the various components shown in FIG. 10 may be implemented in hardware, software or a combination of both hardware and software, including one or more signal processing and/or application specific integrated circuits.

Unmanned Aerial Vehicle—Example System

A UAV 100, according to the present teachings, may be implemented as any type of UAV. A UAV, sometimes referred to as a drone, is generally defined as any aircraft capable of controlled flight without a human pilot onboard. UAVs may be controlled autonomously by onboard computer processors or via remote control by a remotely located human pilot. Similar to an airplane, UAVs may utilize fixed aerodynamic surfaces along with a propulsion system (e.g., propeller, jet, etc.) to achieve lift. Alternatively, similar to helicopters, UAVs may directly use a propulsion system (e.g., propeller, jet, etc.) to counter gravitational forces and achieve lift. Propulsion-driven lift (as in the case of helicopters) offers significant advantages in certain implementations, for example, as a mobile filming platform, because it allows for controlled motion along all axes.

Multi-rotor helicopters, in particular quadcopters, have emerged as a popular UAV configuration. A quadcopter (also known as a quadrotor helicopter or quadrotor) is a multi-rotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, a first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors but in a balanced fashion such that lift is increased on one side of the craft and decreased on the other side of the craft. An adjustment in altitude from hover may be induced by applying a balanced variation in all four rotors, thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will therefore accelerate the craft forward on a horizontal plane.

FIG. 113 shows a diagram of an example UAV system 1300 including various functional system components that may be part of a UAV 100, according to some embodiments. UAV system 1300 may include one or more means for propulsion (e.g., rotors 1302 and motor(s) 1304), one or more electronic speed controllers 1306, a flight controller 1308, a peripheral interface 1310, processor(s) 1312, a memory controller 1314, a memory 1316 (which may include one or more computer readable storage media), a power module 1318, a GPS module 1320, a communications interface 1322, audio circuitry 1324, an accelerometer 1326 (including subcomponents such as gyroscopes), an inertial measurement unit (IMU) 1328, a proximity sensor 1330, an optical sensor controller 1332 and associated optical sensor(s) 1334, a mobile device interface controller 1336 with associated interface device(s) 1338, and any other input controllers 1340 and input device(s) 1342, for example, display controllers with associated display device(s). These components may communicate over one or more communication buses or signal lines as represented by the arrows in FIG. 13.

UAV system 1300 is only one example of a system that may be part of a UAV 100. A UAV 100 may include more or fewer components than shown in system 1300, may combine two or more components as functional units, or may have a different configuration or arrangement of the components. Some of the various components of system 1300 shown in FIG. 13 may be implemented in hardware, software or a combination of both hardware and software, including one or more signal processing and/or application specific integrated circuits. Also, UAV 100 may include an off-the-shelf UAV (e.g., a currently available remote controlled quadcopter) coupled with a modular add-on device (for example, one including components within outline 1390) to perform the innovative functions described in this disclosure.

As described earlier, the means for propulsion 1302-1304 may comprise fixed-pitch rotors. The means for propulsion may also include variable-pitch rotors (for example, using a gimbal mechanism), a variable-pitch jet engine, or any other mode of propulsion having the effect of providing force. The means for propulsion 1302-1304 may include a means for varying the applied thrust, for example, via an electronic speed controller 1306 varying the speed of each fixed-pitch rotor.

Flight controller 1308 may include a combination of hardware and/or software configured to receive input data (e.g., sensor data from image capture devices 1334, and or generated trajectories form an autonomous navigation system 120), interpret the data and output control commands to the propulsion systems 1302-1306 and/or aerodynamic surfaces (e.g., fixed wing control surfaces) of the UAV 100. Alternatively or in addition, a flight controller 1308 may be configured to receive control commands generated by another component or device (e.g., processors 1612 and/or a separate computing device), interpret those control commands and generate control signals to the propulsion systems 1302-1306 and/or aerodynamic surfaces (e.g., fixed wing control surfaces) of the UAV 100. In some embodiments, the previously mentioned navigation system 120 of the UAV 100 may comprise the flight controller 1308 and/or any one or more of the other components of system 1300. Alternatively, the flight controller 1308 shown in FIG. 13 may exist as a component separate from the navigation system 120, for example, similar to the flight controller 160 shown in FIG. 1B

Memory 1316 may include high-speed random access memory and may also include non-volatile memory, such as one or more magnetic disk storage devices, flash memory devices, or other non-volatile solid-state memory devices. Access to memory 1316 by other components of system 1300, such as the processors 1312 and the peripherals interface 1310, may be controlled by the memory controller 1314.

The peripherals interface 1310 may couple the input and output peripherals of system 1300 to the processor(s) 1312 and memory 1316. The one or more processors 1312 run or execute various software programs and/or sets of instructions stored in memory 1316 to perform various functions for the UAV 100 and to process data. In some embodiments, processors 1312 may include general central processing units (CPUs), specialized processing units such as graphical processing units (GPUs) particularly suited to parallel processing applications, or any combination thereof. In some embodiments, the peripherals interface 1310, the processor(s) 1312, and the memory controller 1314 may be implemented on a single integrated chip. In some other embodiments, they may be implemented on separate chips.

The network communications interface 1322 may facilitate transmission and reception of communications signals often in the form of electromagnetic signals. The transmission and reception of electromagnetic communications signals may be carried out over physical media such as copper wire cabling or fiber optic cabling, or may be carried out wirelessly, for example, via a radiofrequency (RF) transceiver. In some embodiments, the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including, but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11n and/or IEEE 802.11ac), voice over Internet Protocol (VOIP), Wi-MAX, or any other suitable communication protocols.

The audio circuitry 1324, including the speaker and microphone 1350, may provide an audio interface between the surrounding environment and the UAV 100. The audio circuitry 1324 may receive audio data from the peripherals interface 1310, convert the audio data to an electrical signal, and transmit the electrical signal to the speaker 1350. The speaker 1350 may convert the electrical signal to human-audible sound waves. The audio circuitry 1324 may also receive electrical signals converted by the microphone 1350 from sound waves. The audio circuitry 1324 may convert the electrical signal to audio data and transmit the audio data to the peripherals interface 1310 for processing. Audio data may be retrieved from and/or transmitted to memory 1316 and/or the network communications interface 1322 by the peripherals interface 1310.

The I/O subsystem 1360 may couple input/output peripherals of UAV 100, such as an optical sensor system 1334, the mobile device interface 1338, and other input/control devices 1342, to the peripherals interface 1310. The I/O subsystem 1360 may include an optical sensor controller 1332, a mobile device interface controller 1336, and other input controller(s) 1340 for other input or control devices. The one or more input controllers 1340 receive/send electrical signals from/to other input or control devices 1342.

The other input/control devices 1342 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the UAV 100 and a user. A display controller may receive and/or send electrical signals from/to the touch screen. The touch screen may display visual output to a user. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 1316) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including, but not limited to, capacitive, resistive, infrared, and surface acoustic wave technologies, as well as other proximity sensor arrays or other elements for determining one or more points of contact with a touch screen.

The mobile device interface device 1338 along with mobile device interface controller 1336 may facilitate the transmission of data between a UAV 100 and other computing devices such as a mobile device 104. According to some embodiments, communications interface 1322 may facilitate the transmission of data between UAV 100 and a mobile device 104 (for example, where data is transferred over a Wi-Fi network).

UAV system 1300 also includes a power system 1318 for powering the various components. The power system 1318 may include a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in computerized device.

Figure 13:
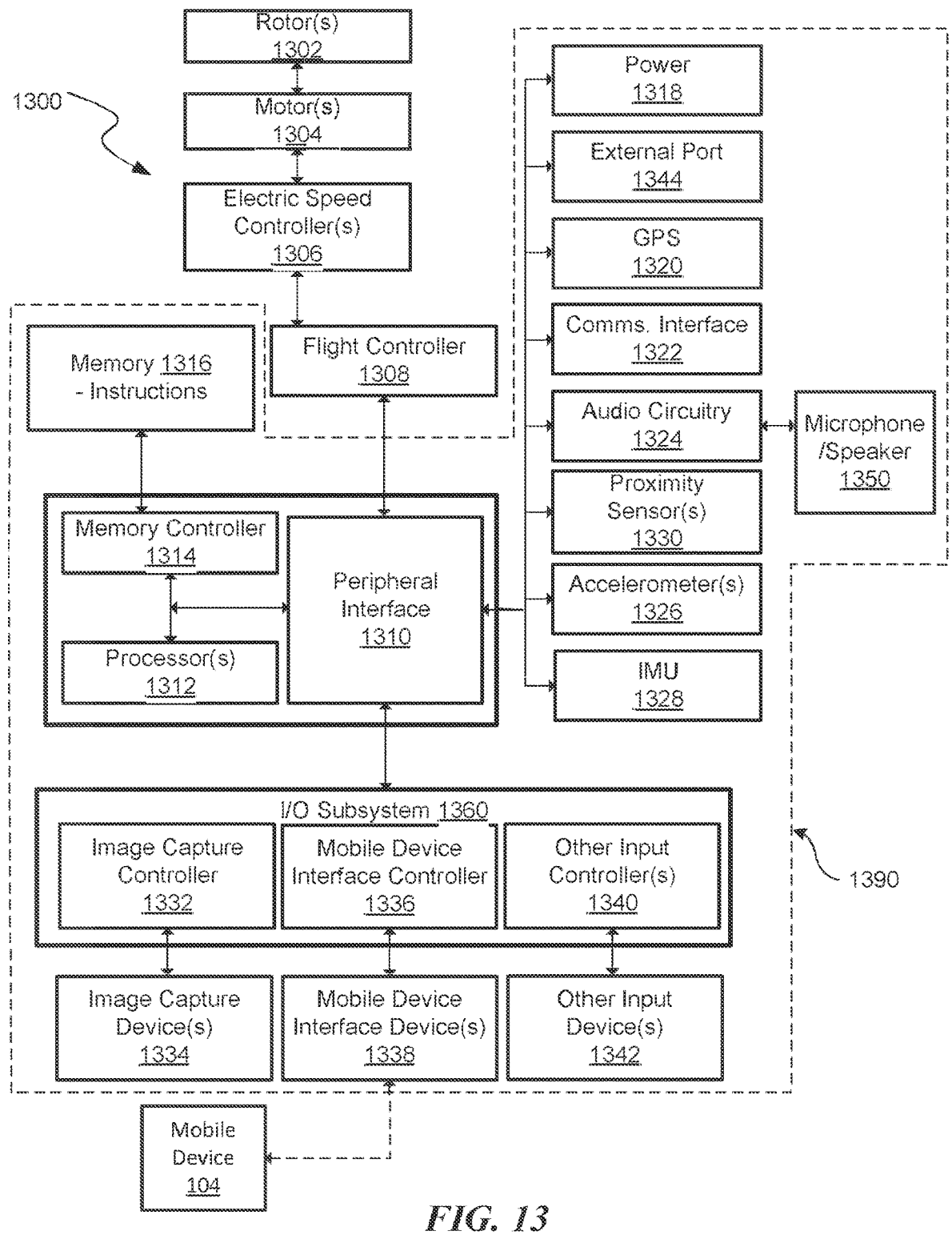
FIG. 13 shows a block diagram of an example UAV system including various functional system components with which at least some operations described in this disclosure can be implemented.

UAV system 1300 may also include one or more image capture devices 1334. Image capture devices 1334 may be the same as the image capture device 114/115 of UAV 100 described with respect to FIG. 1A. FIG. 13 shows an image capture device 1334 coupled to an image capture controller 1332 in I/O subsystem 1360. The image capture device 1334 may include one or more optical sensors. For example, image capture device 1334 may include a charge-coupled device (CCD) or complementary metal-oxide semiconductor (CMOS) phototransistors. The optical sensors of image capture devices 1334 receive light from the environment, projected through one or more lens (the combination of an optical sensor and lens can be referred to as a "camera") and converts the light to data representing an image. In conjunction with an imaging module located in memory 1316, the image capture device 1334 may capture images (including still images and/or video). In some embodiments, an image capture device 1334 may include a single fixed camera. In other embodiments, an image capture device 1340 may include a single adjustable camera (adjustable using a gimbal mechanism with one or more axes of motion). In some embodiments, an image capture device 1334 may include a camera with a wide-angle lens providing a wider FOV. In some embodiments, an image capture device 1334 may include an array of multiple cameras providing up to a full 360 degree view in all directions. In some embodiments, an image capture device 1334 may include two or more cameras (of any type as described herein) placed next to each other in order to provide stereoscopic vision. In some embodiments, an image capture device 1334 may include multiple cameras of any combination as described above. In some embodiments, the cameras of an image capture device 1334 may be arranged such that at least two cameras are provided with overlapping FOV at multiple angles around the UAV 100, thereby allowing for stereoscopic (i.e., 3D) image/video capture and depth recovery (e.g., through computer vision algorithms) at multiple angles around UAV 100. For example, UAV 100 may include four sets of two cameras each positioned so as to provide a stereoscopic view at multiple angles around the UAV 100. In some embodiments, a UAV 100 may include some cameras dedicated for image capture of a subject and other cameras dedicated for image capture for visual navigation (e.g., through visual inertial odometry).

UAV system 1300 may also include one or more proximity sensors 1330. FIG. 13 shows a proximity sensor 1330 coupled to the peripherals interface 1310. Alternately, the proximity sensor 1330 may be coupled to an input controller 1340 in the I/O subsystem 1360. Proximity sensors 1330 may generally include remote sensing technology for proximity detection, range measurement, target identification, etc. For example, proximity sensors 1330 may include radar, sonar, and LIDAR.

UAV system 1300 may also include one or more accelerometers 1326. FIG. 13 shows an accelerometer 1326 coupled to the peripherals interface 1310. Alternately, the accelerometer 1326 may be coupled to an input controller 1340 in the I/O subsystem 1360.

UAV system 1300 may include one or more inertial measurement units (IMU) 1328. An IMU 1328 may measure and report the UAV's velocity, acceleration, orientation, and gravitational forces using a combination of gyroscopes and accelerometers (e.g., accelerometer 1326).

UAV system 1300 may include a global positioning system (GPS) receiver 1320. FIG. 13 shows an GPS receiver 1320 coupled to the peripherals interface 1310. Alternately, the GPS receiver 1320 may be coupled to an input controller 1340 in the I/O subsystem 1360. The GPS receiver 1320 may receive signals from GPS satellites in orbit around the earth, calculate a distance to each of the GPS satellites (through the use of GPS software), and thereby pinpoint a current global position of UAV 100.

In some embodiments, the software components stored in memory 1316 may include an operating system, a communication module (or set of instructions), a flight control module (or set of instructions), a localization module (or set of instructions), a computer vision module, a graphics module (or set of instructions), and other applications (or sets of instructions). For clarity, one or more modules and/or applications may not be shown in FIG. 13.

An operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

A communications module may facilitate communication with other devices over one or more external ports 1644 and may also include various software components for handling data transmission via the network communications interface 1322. The external port 1344 (e.g., Universal Serial Bus (USB), FIREWIRE, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including, without limitation, text, still images, videos, animations, icons (such as user-interface objects including soft keys), and the like. The graphics module in conjunction with a graphics processing unit (GPU) 1312 may process in real time or near real time, graphics data captured by optical sensor(s) 1334 and/or proximity sensors 1330.

A computer vision module, which may be a component of a graphics module, provides analysis and recognition of graphics data. For example, while UAV 100 is in flight, the computer vision module along with a graphics module (if separate), GPU 1312, and image capture devices(s) 1334 and/or proximity sensors 1330 may recognize and track the captured image of an object located on the ground. The computer vision module may further communicate with a localization/navigation module and flight control module to update a position and/or orientation of the UAV 100 and to provide course corrections to fly along a planned trajectory through a physical environment.

A localization/navigation module may determine the location and/or orientation of UAV 100 and provide this information for use in various modules and applications (e.g., to a flight control module in order to generate commands for use by the flight controller 1308).

Image capture devices(s) 1334, in conjunction with an image capture device controller 1332 and a graphics module, may be used to capture images (including still images and video) and store them into memory 1316.

Each of the above identified modules and applications correspond to a set of instructions for performing one or more functions described above. These modules (i.e., sets of instructions) need not be implemented as separate software programs, procedures or modules, and, thus, various subsets of these modules may be combined or otherwise re-arranged in various embodiments. In some embodiments, memory 1316 may store a subset of the modules and data structures identified above. Furthermore, memory 1316 may store additional modules and data structures not described above.

Example Computer Processing System

Figure 14:
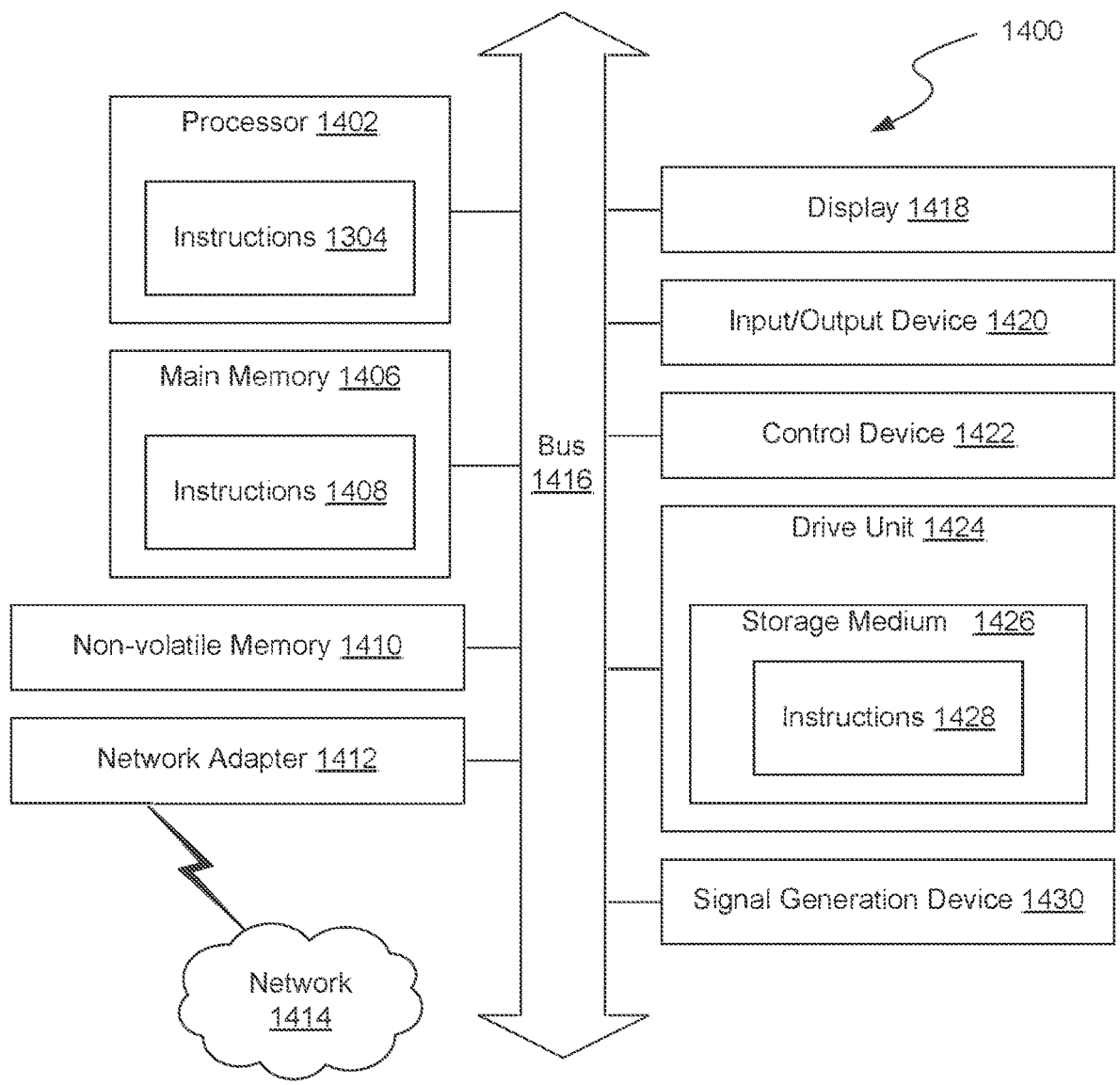
FIG. 14 shows a block diagram of an example of a processing system in which at least some operations described in this disclosure can be implemented.

FIG. 14 is a block diagram illustrating an example of a processing system 1400 in which at least some operations described in this disclosure can be implemented. The example processing system 1400 may be part of any of the aforementioned devices including, but not limited to, UAV 100 and/or mobile device 104. The processing system 1400 may include one or more central processing units ("processors") 1402, main memory 1406, non-volatile memory 1410, network adapter 1412 (e.g., network interfaces), display 1418, input/output devices 1420, control device 1422 (e.g., keyboard and pointing devices), drive unit 1424 including a storage medium 1426, and signal generation device 1430 that are communicatively connected to a bus 1416. The bus 1416 is illustrated as an abstraction that represents any one or more separate physical buses, point to point connections, or both connected by appropriate bridges, adapters, or controllers. The bus 1416, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also called "Firewire"). A bus may also be responsible for relaying data packets (e.g., via full or half duplex wires) between components of the network appliance, such as the switching fabric, network port(s), tool port(s), etc.

In various embodiments, the processing system 1400 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1428. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 1404, 1408, 1428) set at various times in various memory and storage devices in a computer, and that, when read and executed by one or more processing units or processors 1402, cause the processing system 1400 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1610, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1412 enables the processing system 1400 to mediate data in a network 1414 with an entity that is external to the processing system 1400, such as a network appliance, through any known and/or convenient communications protocol supported by the processing system 1400 and the external entity. The network adapter 1412 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1412 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:
1. A method comprising:
  receiving, by a computer system of an autonomous vehicle, images of a physical environment captured by one or more image capture devices coupled to the autonomous vehicle;

processing, by the computer system, the received images to:
  detect an object in the physical environment associated with a particular class of objects; and
  extract semantic information including information related to the detected object in the physical environment and information related to the physical environment itself;
predicting, by the computer system, a trajectory of the detected object in three-dimensional (3D) space of the physical environment based, at least in part, on the extracted semantic information; and
causing, by the computer system, the autonomous vehicle to track the object through the 3D space of the physical environment based, at least in part, on the predicted trajectory.

2. The method of claim 1, wherein processing the received images comprises:
  generating a dense per-pixel segmentation based on the received images,
  wherein each pixel in the dense per-pixel segmentation is associated with a value indicative of a likelihood that the pixel corresponds with the particular class of objects.

3. The method of claim 2, the dense per-pixel segmentation is one of a plurality of dense per-pixel segmentations comprising a tensor, each of the plurality of dense per-pixel segmentations associated with a different class of objects.

4. The method of claim 2, wherein processing the received images to detect the object in the physical environment further comprises:
  detecting additional physical objects in the physical environment; and
  distinguishing between one or more instances of the detected physical objects, the distinguishing including:
  analyzing the dense per-pixel segmentation generated based on the received images to associate pixels corresponding to the particular class of objects with a particular instance of the particular class of objects.

5. The method of claim 4, wherein to associate pixels corresponding to the particular class of objects with the particular instance of the particular class includes:
  applying a grouping process to group:
    pixels that are substantially similar to other pixels associated with the particular instance;
    pixels that are spatially clustered with other pixels associated with the particular instance; and/or
    pixels that fit an appearance-based model for the particular class of objects.

6. The method of claim 1, wherein the semantic information related to the object comprises a particular class of physical object.

7. The method of claim 1, wherein the semantic information includes information regarding any of a position, orientation, shape, size, scale, appearance, or pixel segmentation of the object.

8. The method of claim 1, wherein the semantic information includes information regarding activity of the object.

9. The method of claim 1, further comprising:
  receiving, by the computer system, sensor data from one or more other sensors coupled to the autonomous vehicle; and
  processing, by the computer system, the received sensor data with the received images using a spatiotemporal factor graph to predict the trajectory of the object through the 3D space of the physical environment.

10. The method of claim 1, wherein causing the autonomous vehicle to track the object through the 3D space of the physical environment based on the predicted trajectory comprises:
  generating, by the computer system, control commands configured to cause the autonomous vehicle to maneuver along the predicted trajectory.

11. The method of claim 10, wherein generating the control commands comprises:
  generating control commands configured to cause a gimbal mechanism to adjust an orientation of the image capture device relative to the autonomous vehicle so as to keep the tracked object within a field of view of the image capture device.

12. The method of claim 10, wherein generating the control commands comprises:
  generating, by the computer system, an augmentation based on the object; and
  causing, by the computer system, the generated augmentation to be presented with the object at a display device.

13. The method of claim 1, wherein the autonomous vehicle is an unmanned aerial vehicle (UAV).

14. The method of claim 1, wherein the particular class of objects is selected from a list of classes of objects comprising people, animal, vehicles, buildings, landscape features, and plants.

15. An unmanned aerial vehicle (UAV) configured for autonomous flight through a physical environment, the UAV comprising:
  a first image capture device;
  a second image capture device; and
  a tracking system configured to:
    receive images of the physical environment captured by any of the first image capture device or second image capture device;
    process the received images to:
      detect an object in the physical environment
    extract semantic information including information related to the detected object in the physical environment and information related to the physical environment itself;
    predict a trajectory of the detected object in the three-dimensional (3D) space of the physical environment based, at least in part, on the extracted semantic information; and
    cause the UAV to track the object through the 3D space of the physical environment based, at least in part, on the predicted trajectory.

16. The UAV of claim 15, wherein the semantic information includes information regarding any of a position, orientation, shape, size, scale, appearance, or pixel segmentation of the object.

17. The UAV of claim 15, wherein the semantic information includes information regarding activity of the object.

18. An apparatus comprising:
  one or more computer-readable media; and
  program instructions stored on the one or more computer-readable storage media that, when executed by one or more processors onboard an aerial vehicle, direct the one or more processors to at least:
  process images of the physical environment captured by one or more image capture devices coupled to an autonomous vehicle to:
    detect an object in the physical environment associated with a particular class of objects; and extract semantic information including information related to the detected object in the physical environment and information related to the physical environment itself;

predict a trajectory of the detected object in three-dimensional (3D) space of the physical environment based, at least in part, on the extracted semantic information; and cause the autonomous vehicle to track the object through the 3D space of the physical environment based, at least in part, on the predicted trajectory.

19. The apparatus of claim 18, wherein the semantic information includes information regarding any of a position, orientation, shape, size, scale, appearance, or pixel segmentation of the object.

20. The apparatus of claim 18, wherein the semantic information includes information regarding activity of the object.

\* \* \* \* \*